United States Patent
Frazier et al.

(10) Patent No.: US 9,551,292 B2
(45) Date of Patent: Jan. 24, 2017

(54) SEMI-ISOTHERMAL COMPRESSION ENGINES WITH SEPARATE COMBUSTORS AND EXPANDERS, AND ASSOCIATED SYSTEMS AND METHODS

(71) Applicant: Bright Energy Storage Technologies, LLP, Arvada, CO (US)

(72) Inventors: Scott R. Frazier, Morrison, CO (US); Alex Lau, Vancouver (CA); Brian Von Herzen, Minden, NV (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 506 days.

(21) Appl. No.: 14/135,344

(22) Filed: Dec. 19, 2013

(65) Prior Publication Data

US 2015/0176526 A1 Jun. 25, 2015

Related U.S. Application Data

(63) Continuation of application No. PCT/US2012/044748, filed on Jun. 28, 2012.
(Continued)

(51) Int. Cl.
*F02G 1/055* (2006.01)
*F01K 13/00* (2006.01)
(Continued)

(52) U.S. Cl.
CPC ............... *F02G 1/055* (2013.01); *F01K 13/00* (2013.01); *F02G 1/05* (2013.01); *F02G 1/057* (2013.01); *Y02E 20/14* (2013.01)

(58) Field of Classification Search
CPC ............ F02G 1/055; F02G 1/05; F02G 1/057; F01K 13/00
See application file for complete search history.

(56) References Cited

U.S. PATENT DOCUMENTS

| 125,166 A | 4/1872 | Brayton |
|---|---|---|
| 226,052 A | 3/1880 | Ericsson |

(Continued)

FOREIGN PATENT DOCUMENTS

| GB | 1202125 A | 8/1970 |
|---|---|---|
| GB | 2396664 A | 6/2004 |

(Continued)

OTHER PUBLICATIONS

"Passing Gas—A look at how different compressors ; work,"; http://www.fscc-online.com/%22Passing%20Gas%ss-article/passing_gas.html, accessed Mar. 2, 2011,; 3 pages.
(Continued)

*Primary Examiner* — Corey Skurdal
(74) *Attorney, Agent, or Firm* — Perkins Coie LLP

(57) ABSTRACT

Engine systems and associated methods, including systems with semi-isothermal compression devices are disclosed. An engine system in accordance with a particular embodiment includes a compressor having a compressor inlet and outlet, a combustor having a combustor inlet coupled to the compressor outlet and further having a combustor outlet, a positive displacement expander having an expander inlet coupled to the combustor outlet, and further having an expander outlet and a work output device. A valve is coupled between the combustor and the expander to regulate a flow of hot combustion products passing from the combustor to the expander, and an exhaust energy recovery device is coupled to the expander outlet to extract energy from the combustion products exiting the expander.

28 Claims, 22 Drawing Sheets

Related U.S. Application Data

(60) Provisional application No. 61/502,308, filed on Jun. 28, 2011, provisional application No. 61/569,691, filed on Dec. 12, 2011.

(51) Int. Cl.
  *F02G 1/05* (2006.01)
  *F02G 1/057* (2006.01)

(56) References Cited

U.S. PATENT DOCUMENTS

| | | |
|---|---|---|
| 1,297,363 A | 3/1919 | Kneedler |
| 1,310,157 A | 7/1919 | Campo |
| 1,641,121 A | 8/1927 | Creel |
| 1,782,314 A | 11/1930 | Poirmeur |
| 1,895,816 A | 1/1933 | Pfeiffer |
| 2,298,525 A | 10/1942 | Briggs |
| 3,190,227 A | 6/1965 | Davids et al. |
| 3,225,661 A | 12/1965 | Smyser |
| 3,295,505 A | 1/1967 | Jordan |
| 2,693,031 A | 2/1969 | Rubin |
| 3,426,525 A | 2/1969 | Rubin |
| 3,533,716 A | 10/1970 | Grun |
| 3,621,654 A | 11/1971 | Hull et al. |
| 3,677,008 A | 7/1972 | Koutz |
| 3,743,454 A | 7/1973 | Rinehart |
| 3,744,245 A | 7/1973 | Kelly |
| 3,762,167 A | 10/1973 | Wahnschaffe et al. |
| 3,775,973 A | 12/1973 | Hudson |
| 3,783,615 A | 1/1974 | Hubers |
| 3,791,352 A | 2/1974 | Takacs |
| 3,797,973 A | 3/1974 | Prasse et al. |
| 3,800,760 A | 4/1974 | Knee |
| 3,844,692 A | 10/1974 | McLain |
| 3,883,273 A | 5/1975 | King |
| 3,891,357 A | 6/1975 | Davis et al. |
| 3,899,272 A | 8/1975 | Pratt |
| 3,945,220 A | 3/1976 | Kosfeld |
| 3,958,907 A | 5/1976 | Goloff |
| 3,959,907 A | 6/1976 | Anderson |
| 3,970,050 A | 7/1976 | Hoadley |
| 3,986,359 A | 10/1976 | Manning et al. |
| 3,990,817 A | 11/1976 | Ruf et al. |
| 4,009,573 A | 3/1977 | Satz |
| 4,023,366 A | 5/1977 | Schneider |
| 4,058,988 A | 11/1977 | Shaw |
| 4,106,472 A | 8/1978 | Rusk |
| 4,118,157 A | 10/1978 | Mayer |
| 4,118,158 A | 10/1978 | Osaki |
| 4,133,172 A | 1/1979 | Cataldo |
| 4,187,692 A | 2/1980 | Midolo |
| 4,215,533 A | 8/1980 | Silvestri |
| 4,224,798 A | 9/1980 | Brinkerhoff |
| 4,300,874 A | 11/1981 | Georgiev |
| 4,345,886 A | 8/1982 | Nakayama et al. |
| 4,367,638 A | 1/1983 | Gray |
| 4,434,757 A | 3/1984 | Walker |
| 4,523,432 A | 6/1985 | Frutschi |
| 4,739,632 A | 4/1988 | Fry |
| 4,759,325 A | 7/1988 | Jones |
| 4,760,701 A | 8/1988 | David |
| 4,773,846 A | 9/1988 | Munk |
| 4,864,985 A | 9/1989 | Slee |
| 4,885,909 A | 12/1989 | Rodgers |
| 5,050,570 A | 9/1991 | Thring |
| 5,127,377 A | 7/1992 | Yang |
| 5,199,864 A | 4/1993 | Stecklein |
| 5,212,942 A * | 5/1993 | Malohn ................. F02C 7/10 60/39.17 |
| 5,239,833 A | 8/1993 | Fineblum |
| 5,352,139 A | 10/1994 | Laukien et al. |
| 5,391,067 A | 2/1995 | Saunders |
| 5,494,424 A | 2/1996 | Schnell |
| 5,522,235 A | 6/1996 | Matsuoka et al. |
| 5,537,822 A | 7/1996 | Shnaid et al. |
| 5,590,528 A | 1/1997 | Viteri |
| 5,667,370 A | 9/1997 | Im |
| 5,832,728 A | 11/1998 | Buck |
| 5,839,270 A | 11/1998 | Jirnov et al. |
| 5,894,729 A | 4/1999 | Proeschel |
| 5,960,625 A | 10/1999 | Zdvorak, Sr. |
| 6,085,506 A | 7/2000 | Fineblum |
| 6,092,365 A | 7/2000 | Leidel |
| 6,336,317 B1 | 1/2002 | Holtzapple et al. |
| 6,464,467 B2 | 10/2002 | Sullivan et al. |
| 6,499,534 B1 | 12/2002 | Tawney et al. |
| 6,530,211 B2 | 3/2003 | Holtzapple et al. |
| 6,606,860 B2 | 8/2003 | McFarland |
| 6,659,065 B1 | 12/2003 | Renegar |
| 6,672,063 B1 | 1/2004 | Proeschel |
| 6,718,751 B2 | 4/2004 | Mehail |
| 6,796,123 B2 | 9/2004 | Lasker |
| 6,817,185 B2 | 11/2004 | Coney et al. |
| 6,886,326 B2 | 5/2005 | Holtzapple et al. |
| 6,926,505 B2 | 8/2005 | Sbarounis |
| 6,929,505 B2 | 8/2005 | He et al. |
| 6,944,935 B2 | 9/2005 | Hache |
| 6,955,052 B2 | 10/2005 | Primlani |
| 7,028,476 B2 | 4/2006 | Proeschel |
| 7,097,436 B2 | 8/2006 | Wells |
| 7,240,478 B2 | 7/2007 | Kopko |
| 7,249,459 B2 | 7/2007 | Hisanaga et al. |
| 7,401,475 B2 | 7/2008 | Hugenroth et al. |
| 7,481,189 B2 | 1/2009 | Zajac |
| 7,549,841 B1 | 6/2009 | Marussich |
| 7,614,861 B2 | 11/2009 | Nagler |
| 7,745,946 B2 | 6/2010 | Ambrose |
| 7,765,785 B2 | 8/2010 | Kashmerick |
| 7,866,962 B2 | 1/2011 | Newland |
| 8,006,496 B2 | 8/2011 | Carter |
| 8,037,677 B2 | 10/2011 | Fong et al. |
| 8,096,117 B2 | 1/2012 | Ingersoll et al. |
| 8,176,748 B2 | 5/2012 | Cao |
| 8,196,395 B2 | 6/2012 | Fong et al. |
| 8,201,402 B2 | 6/2012 | Fong et al. |
| 8,207,402 B2 | 6/2012 | Teoh et al. |
| 8,240,142 B2 | 8/2012 | Fong et al. |
| 8,247,915 B2 | 8/2012 | Crane et al. |
| 8,261,552 B2 | 9/2012 | Nakhamkin |
| 8,308,458 B2 | 11/2012 | Kettlewell et al. |
| 8,359,857 B2 | 1/2013 | Ingersoll et al. |
| 2001/0025478 A1 | 10/2001 | Fineblum |
| 2002/0028151 A1 | 3/2002 | Manner et al. |
| 2002/0112479 A1 | 8/2002 | Keefer et al. |
| 2002/0114706 A1 | 8/2002 | Bassine |
| 2003/0049139 A1 | 3/2003 | Coney et al. |
| 2004/0129018 A1 | 7/2004 | Rini et al. |
| 2005/0180874 A1 | 8/2005 | Wells |
| 2005/0257523 A1* | 11/2005 | Proeschel ................. F02G 3/02 60/651 |
| 2006/0127264 A1 | 6/2006 | Aquino et al. |
| 2006/0233653 A1 | 10/2006 | Trapalis |
| 2006/0242942 A1 | 11/2006 | Johnson |
| 2006/0248886 A1 | 11/2006 | Ma |
| 2006/0260312 A1 | 11/2006 | Ingersoll |
| 2007/0044751 A1 | 3/2007 | Guan et al. |
| 2007/0145748 A1 | 6/2007 | Pierz |
| 2007/0234749 A1 | 10/2007 | Enis et al. |
| 2007/0295673 A1 | 12/2007 | Enis et al. |
| 2008/0000775 A1 | 1/2008 | Childers et al. |
| 2008/0095652 A1 | 4/2008 | Jiang |
| 2008/0149066 A1 | 6/2008 | Hendrix et al. |
| 2008/0226480 A1 | 9/2008 | Ferran et al. |
| 2009/0081061 A1 | 3/2009 | Chomyszak et al. |
| 2009/0211260 A1* | 8/2009 | Kesseli ................. F02C 1/02 60/786 |
| 2010/0089062 A1 | 4/2010 | Cao |
| 2010/0251757 A1 | 10/2010 | Hasegawa et al. |
| 2010/0257862 A1 | 10/2010 | Howes et al. |
| 2010/0326075 A1* | 12/2010 | Fong ................. F01K 25/06 60/650 |
| 2011/0023488 A1 | 2/2011 | Fong et al. |
| 2011/0023814 A1 | 2/2011 | Shkolnik et al. |
| 2011/0070031 A1 | 3/2011 | Frazier et al. |

(56) References Cited

U.S. PATENT DOCUMENTS

| | | |
|---|---|---|
| 2011/0070032 A1 | 3/2011 | Frazier et al. |
| 2011/0115223 A1 | 5/2011 | Stahlkopf et al. |
| 2011/0204064 A1 | 8/2011 | Crane et al. |
| 2011/0209477 A1 | 9/2011 | Frazier et al. |
| 2011/0209480 A1 | 9/2011 | Frazier et al. |
| 2011/0211916 A1 | 9/2011 | Frazier et al. |
| 2011/0217197 A1 | 9/2011 | Frazier et al. |
| 2012/0012089 A1 | 1/2012 | Phillips |
| 2012/0012276 A1 | 1/2012 | Von Herzen et al. |
| 2012/0048230 A1 | 3/2012 | Darrow |
| 2012/0048320 A1 | 3/2012 | Hardie |
| 2012/0119510 A1 | 5/2012 | Herzen et al. |
| 2012/0224986 A1 | 9/2012 | Shimaguchi et al. |
| 2014/0007569 A1* | 1/2014 | Gayton .................. F02G 1/055 60/508 |
| 2014/0174086 A1* | 6/2014 | Kare ....................... F01K 11/00 60/670 |

FOREIGN PATENT DOCUMENTS

| | | |
|---|---|---|
| GB | 2396887 A | 7/2004 |
| RU | 2432474 C2 | 10/2011 |
| WO | WO-8606437 A1 | 11/1986 |
| WO | WO-2008050654 A1 | 5/2008 |
| WO | WO-2009073406 A2 | 6/2009 |
| WO | WO-2010/017199 A2 | 2/2010 |
| WO | WO-2011109449 A1 | 9/2011 |

OTHER PUBLICATIONS

"The Guided Rotor Compressor—A Compressor for the; the 21st Century," http://www.grcompressor.com/; Mar. 2, 2011, 16 pages.
International Search Report and Written Opinion for; International Patent Application No. PCT/US12/44748,; Applicant: Bright Energy Storage Technology, LLP,; mailed Jan. 10, 2013, 16 pages.
International Search Report and Written Opinion for; International Patent Application No. PCT/US13/54582,; Applicant: Bright Energy Storage Technology, LLP,; mailed Nov. 13, 2013, 15 pages.
Johansson, Bengt. "Path to High Efficiency Gasoline Engine," Division of Combustion Engines, Department of Energy Sciences: Lund University, 102 pages.
ZPS—Ziolkowski Patent Solutions Group SC, Imagine Invent Protect®, http://zpspatents.com, Mar. 2, 2011, 1 page.
"Submerged Archimedes Screw Heat Engine Air Compressor—Renewable Energy Design," http://renewableenergy.wikia.com/wiki/Submerged_Archimedes_Screw_Heat_Engine_Air_Compressor, Jul. 3, 2011, 7 pages.

* cited by examiner

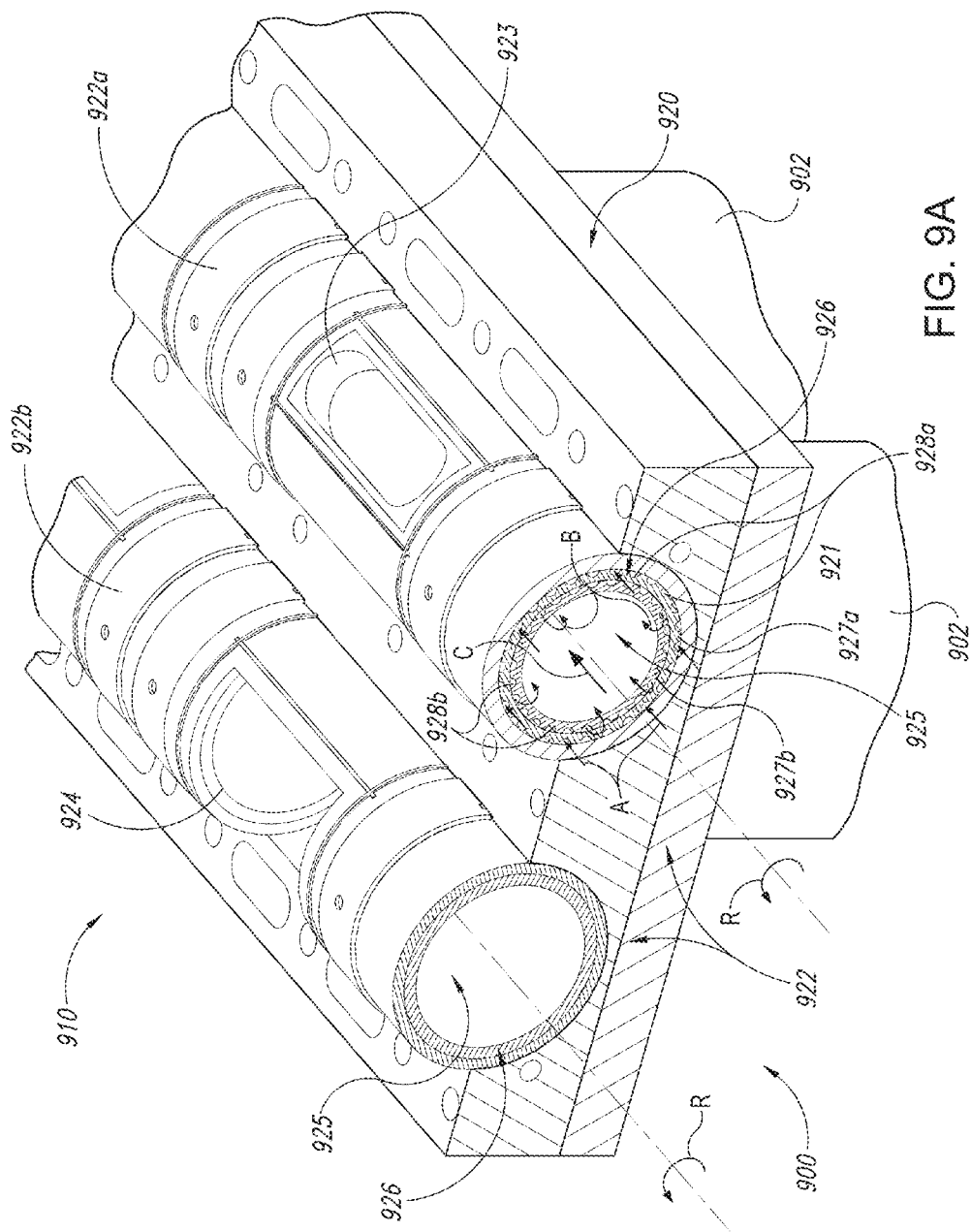

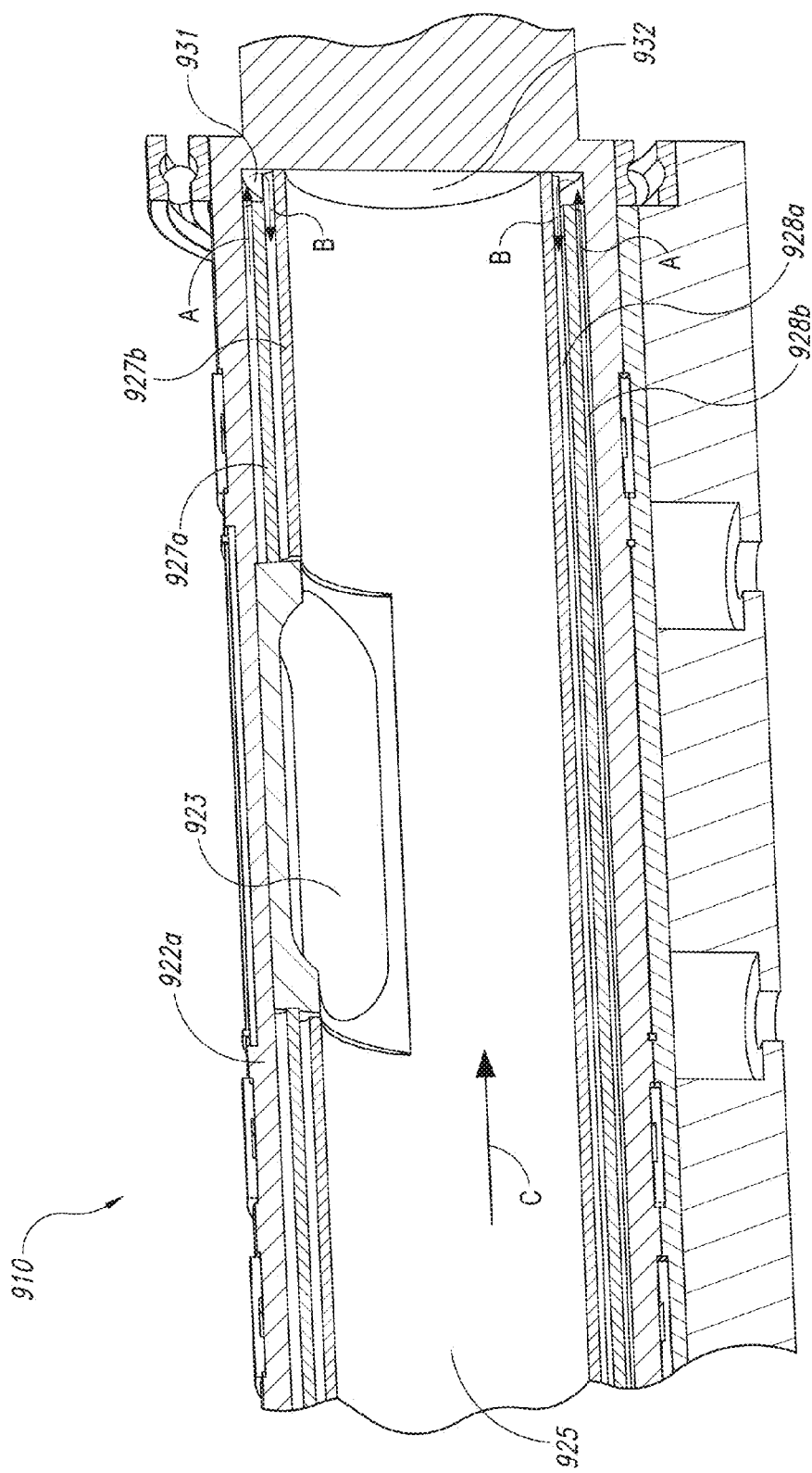

SEMI-ISOTHERMAL COMPRESSION ENGINES WITH SEPARATE COMBUSTORS AND EXPANDERS, AND ASSOCIATED SYSTEMS AND METHODS

CROSS-REFERENCE TO RELATED APPLICATIONS

The present application is a continuation of International Patent Application No. PCT/US12/44748, filed Jun. 28, 2012, which claims priority to U.S. Provisional Application No. 61/502,308, filed Jun. 28, 2011, and U.S. Provisional Application No. 61/569,691, filed Dec. 12, 2011, both of which are incorporated herein by reference. To the extent the foregoing applications and/or any other materials incorporated herein by reference conflict with the disclosure provided in the present application, the present application controls.

TECHNICAL FIELD

The present technology relates, in general, to engines. Particular embodiments relate to a semi-isothermal compression engines with recuperation and a combustor separated from a positive displacement expander.

BACKGROUND

In a world where energy efficiency has become a crucial industrial, economic and even household issue, it is important to take energy conversion efficiency into consideration in power and energy conversion systems and in engines in particular. The current state of the art for engines is dominated by internal combustion engines based upon open-loop Otto cycle, Diesel cycle, or Brayton thermodynamic power cycles. Engines based upon these cycles are sufficiently efficient for many applications, being typically represented by automobiles, heavy trucks and aircraft turbines respectively.

Otto Cycle and Diesel Cycle engines are used primarily for application in internal combustion engines for automobile and other low cost consumer applications. These types of engines are adequately efficient, lightweight, and relatively inexpensive to manufacture for wide use, with relatively low consequent unit costs resulting from the economy of scale.

Internal combustion engines typically employ air as a working fluid. Combustion heat is created by injecting and burning fuel with the air as a working fluid at suitable points and times in the thermodynamic cycle of the engine. This enables the working fluid to be expanded and to perform work. For a number of reasons these engines produce much less power than their theoretical limits. Much focus has therefore been on improving the designs and efficiencies for these types of engines as a means to convert power.

Problems associated with conventional internal combustion engines include: typical efficiencies of only approximately 20% to 40%; the need for specific fuel types for each type of engine; and significant emissions of green house gas and other air pollutants. Several of the reasons for the limitations in efficiency are founded in the fact that the compression, combustion and expansion all happen in the same volume. Given the vagaries of timing, fuel supply, ignition, and inherently incomplete expansion of the working fluid in these engines, the thermodynamic cycles of these systems are notoriously difficult to optimize within one volume.

The ideal thermodynamic model for an engine is the Carnot cycle, but its efficiencies are not achievable in practical engine systems. Thermodynamic engine cycles based on isothermal compression or expansion hold most promise of high efficiency. Unfortunately, suitable isothermal compression or expansion is difficult to achieve under practical conditions without resorting to complex and bulky heat exchangers, and/or injecting substantial volumes of direct contact heat exchange fluids into the process flow, which also adds complexity and can increase losses. True isothermal compression or expansion remains in the domain of theory, along with the Carnot cycle itself.

The present technology is addressed to the above challenges in respect of engines as they pertain to the field of power generation, storage and use.

SUMMARY

Several non-limiting embodiments of the technology disclosed herein are summarized below. An embodiment in accordance with a first aspect of the present technology includes an engine comprising a cooled compressor operably configured for compressing a first fluid; a compressed fluid heater operably configured for receiving and heating the compressed first fluid; a positive displacement expander operably configured for controllably receiving the heated compressed first fluid from the compressed fluid heater; and a recuperator operably configured for receiving the compressed first fluid from the compressor, the recuperator can accordingly preheat the compressed first fluid, and supply the preheated compressed first fluid to the compressed fluid heater. The first fluid can be a gas, including but not limited to air, and the compressed fluid heater can be a combustor in which the first fluid is combusted to produce heat.

The compressor can comprise a first plurality of compression stages. At least one intercooler can be disposed in fluid communication between two successive compression stages, and can be operably configured for: receiving compressed first fluid from a first of the two successive compression stages; cooling the compressed first fluid; and providing the compressed first fluid to the second of the two successive compression stages.

The recuperator can be configured to preheat the compressed first fluid by maintaining thermal communication between the compressed first fluid and a second fluid. The second fluid can be an exhaust fluid from the positive displacement expander. In other embodiments, heat can be recuperated from the compressor and/or external sources, e.g., solar heat, waste heat, or other external sources.

The positive displacement expander can comprise a reciprocating expander and a high temperature intake valve. The high temperature intake valve is disposed in fluid communication with the expansion chamber of the reciprocating expander and the heater and is configured for controlling the ingress of heated, compressed first fluid from the heater into the positive displacement expander. The valve is operable at temperatures in excess of 1200 K at any time or location of the overall cycle. In some embodiments the valve is operable at temperatures above 1400 K, e.g., 1600 K, 1700 K, 2000 K, 2400 K, 2800 K, or above. The valve can have ceramic-coated operational surfaces and/or other features that facilitate high temperature operation. The valve can be a rotary valve, in particular embodiments and a poppet or other valve in other embodiments.

In still further embodiments, the positive displacement expander can comprise a rotary expander and a valveless port. The rotary expander can have one or more rotary members and can be operably configured for controllably receiving the heated compressed first fluid from the compressed fluid heater.

The combustor can be a continuous combustor, a pulsed combustor, and/or another suitable combustor. The engine can comprise one or more sensors, one or more flow modulator effectors, and one or more microcontrollers operably configured to monitor and control the sensor(s) and the modulating effector(s). The microcontroller(s) can be operably configured to vary at least one of a power produced by the engine, a rate of supply of fuel, a source of the fuel, operator limits, and emissions characteristics of the expander.

A method for generating power from a fuel in accordance with a further aspect of the presently disclosed technology includes semi-isothermally compressing a first fluid, preheating the compressed first fluid using heat from a second fluid, heating the compressed first fluid in a heater, expanding the heated compressed first fluid in a positive displacement expander, and controlling an ingress of heated compressed first fluid from the heater to the positive displacement expander. The semi-isothermal compression can comprise a plurality of stages of compression, and the compressed first fluid can be intercooled in between at least one pair of immediately successive stages of compression of said plurality of stages of compression.

The second fluid can be an exhaust fluid from the expansion process and the preheating process can comprise exchanging heat between the second fluid and the compressed first fluid. The ingress of heated compressed first fluid from the heater to the positive displacement expander can be controlled with a high-temperature valve operable at relatively high temperatures, e.g., greater than 1400 K.

An engine system in accordance with another aspect of the presently disclosed technology further includes a fluid storage compressor operably configured for compressing the compressed first fluid to a storage pressure. The engine system can further include a high pressure fluid storage tank or other volume for storing the compressed first fluid at the storage pressure, and a directing valve disposed in a high pressure fluid line between the semi-isothermal compressor and the recuperator. The directing valve can be operably configured for selecting from among (a) directing compressed first fluid from the semi-isothermal compressor to the recuperator, (b) directing compressed first fluid from the cooled compressor to the high pressure fluid storage compressor, and (c) directing compressed first fluid from the high pressure fluid storage tank to the recuperator. The fluid storage compressor can also operate as an expander for receiving from the stored high pressure first fluid and expanding the first fluid, e.g., before the first fluid is combusted or otherwise heated.

A method for converting energy in accordance with a further aspect of the presently disclosed technology includes semi-isothermally compressing a first fluid, and selectably subjecting the compressed first fluid to one of an energy extraction process and a high pressure storing process. The energy extraction process can include preheating the compressed first fluid using heat from a second fluid, further heating the compressed first fluid by combusting the first fluid (or a mixture of the first fluid and a fuel), to generate heat, expanding the heated compressed first fluid in a rotary, reciprocating or other positive displacement expander, and controlling an ingress of heated compressed first fluid from the heater to the positive displacement expander. The high pressure storing process can include further compressing the first fluid and collecting the first fluid in a high pressure fluid storage tank.

A method for converting energy in accordance with a further aspect of the presently disclosed technology includes semi-isothermally compressing a first fluid, storing the semi-isothermally compressed first fluid at storage pressure in fluid storage tank or other volume, and selectably subjecting the compressed first fluid to one of an energy extracting process and an expanding process to perform work in a reversible (e.g., user-reconfigurable) compressor/expander. The energy extraction process can include preheating the compressed first fluid using heat from a second fluid, further heating the compressed first fluid (e.g., via combustion), further expanding the heated compressed first fluid in a positive displacement expander, and controlling an ingress of heated compressed first fluid from the heater to the positive displacement expander.

BRIEF DESCRIPTION OF THE DRAWINGS

FIG. 9A is a partially schematic, isometric illustration of a portion of an expander having a rotary valve in accordance with an embodiment of the present technology.

FIG. 9D is a partially schematic, cut-away illustration of an arrangement for coupling flow passages in two liners of a rotary valve in accordance with an embodiment of the present technology.

DETAILED DESCRIPTION

Figure 1:
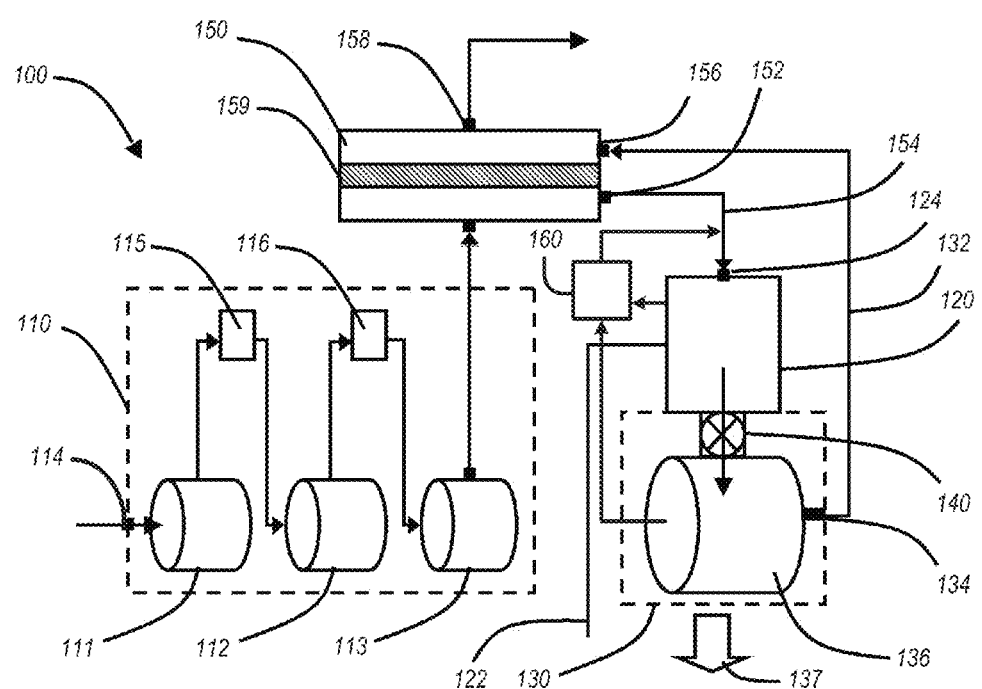
FIG. 1 illustrates an embodiment of an engine according to the presently disclosed technology.

Embodiments of the presently disclosed technology include engines that exploits the benefits associated with separating the heater, expander and compression subsystems to improve (e.g., optimize) the subsystem processes separately, while employing semi-isothermal compression along with heat recuperation. The result is an engine with very high efficiency for its cost, and/or with low emission levels and good latitude in fuel requirements. Several details describing structures or processes that are well-known and often associated with engine systems, but that may unnecessarily obscure some significant aspects of the presently disclosed technology, are not set forth in the following description for purposes of clarity. Moreover, although the following disclosure sets forth several embodiments of different aspects of the technology, several other embodiments can have different configurations or different components than those described in this section. Accordingly, the technology may have other embodiments with additional elements, and/or without several of the elements described below with reference to FIGS. 1-14C.

Several embodiments of the technology described below may take the form of computer-executable instructions, including routines executed by a programmable computer. Those skilled in the relevant art will appreciate that the technology can be practiced on computer systems other than those shown and described below. The technology can be embodied in a special-purpose computer or data processor that is specifically programmed, configured, or constructed to perform one or more of the computer-executable instructions describe below. Accordingly, the term "computer" and "controller" as generally used herein refer to any data processor and can include Internet appliances and hand-held devices (including palm-top computers, wearable computers, cellular or mobile phones, multi-processors systems, processor-based or programmable consumer electronics, network computers, mini computers and the like). Aspects of the presently disclosed technology can be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer discs, as well as distributed electronically over networks. In some embodiments, data structures and transmissions of data particular to aspects of the technology are also encamped within the technology. In other embodiments, such data structures and transmissions are omitted.

The drawings and the associated descriptions are provided to illustrate embodiments of the presently disclosed technology and not to limit the scope of the technology. Reference in the specification to "one embodiment" or "an embodiment" is intended to indicate that a particular feature, structure, or characteristic described in connection with the embodiment is included in at least an embodiment of the present technology. The appearances of the phrase "in one embodiment" or "an embodiment" in various places in the specification are not necessarily all referring to the same embodiment.

As used in this disclosure, except where the context requires otherwise, the term "comprise" and variations of the term, such as "comprising," "comprises" and "comprised" are not intended to exclude other additives, components, integers or steps.

Several embodiments are disclosed as a process that is depicted as a flowchart, a flow diagram, a structure diagram, or a block diagram. Although a flowchart may disclose various steps of the operations as a sequential process, many of the operations can be performed in parallel or concurrently. The steps shown are not intended to be limiting nor are they intended to indicate that each step depicted is essential to the method, but instead are representative steps only.

In one embodiment, shown schematically in FIG. 1, an engine system 100 comprises a cooled compressor 110 operably configured for compressing a first fluid, and a compressed fluid heater 120 operably configured for receiving and heating the compressed first fluid. The engine system 100 further comprises a positive displacement expander 130 for receiving the heated compressed first fluid from the compressed fluid heater 120 via a high temperature intake valve 140 separating the interior of the heater 120 from the interior of the positive displacement expander 130. The engine system 100 further includes a recuperator 150 (e.g., a heat exchanger) or other exhaust energy recovery device configured for receiving the compressed first fluid from the cooled compressor 110, preheating the compressed first fluid, and supplying the preheated compressed first fluid to the compressed fluid heater 120. In this embodiment, the first fluid, (e.g., the working fluid) is air. In other embodiments, the first fluid can be any suitable fluid exhibiting suitable expansion upon heating, including but not limited to a gas. A work output device 137 delivers work from the expander 130, e.g., in the form of shaft power or another energy form can be used to drive a generator and/or provide other useful functions. The compressor 110 and the expander 130 can have distinct working fluid volumes, e.g., the working fluid volumes of each are not overlapping. In some embodiments, the heater 120 (e.g., a combustor) has a working fluid volume that is distinct from both the compressor working fluid volume and the expander working fluid volume. In at least some embodiments, not all three volumes are distinct. For example, the heater volume can overlap with (e.g., include or be included in) the expander volume.

In a particular embodiment, the compressed fluid heater 120 is a continuous combustor to which fuel is supplied via a fuel supply line 122 so as to be combusted with the first fluid (e.g., air) supplied from the recuperator 150 via a recuperator fluid outlet 152, a preheated fluid line 154 and a heater inlet 124. In other embodiments the compressed fluid heater 120 can be a pulsed combustor or any general heater suitable for heating a working fluid. When the heater 120 includes a pulsed combustor, the pulsed combustor can be tuned to harmonize with the frequency of the opening and closing of the last compressor output port or the opening and closing of the expander input port or any of a variety of resonances within the system. This coordinated arrangement can reduce fluid flow friction and flow pumping losses. The pulsed combustor can be tuned to be out of phase with some of the harmonics of the system, to reduce vibration and noise.

The compressor 110 can include a plurality of portions or compression stages. In FIG. 1, by way of example, three portions or compression stages 111, 112 and 113 are shown. In this embodiment, air is supplied as working fluid to the sequence of compression stages 111, 112 and 113 via an ambient air inlet 114. At least one intercooler or other heat transfer device can be disposed in fluid communication between two successive compression stages, and can be operably configured for receiving compressed first fluid from a first of the two successive compression stages. The intercooler cools the compressed first fluid and provides the compressed first fluid to the second of the two successive compression stages. In the example shown in FIG. 1, a first intercooler 115 is disposed between the first compression stage 111 and the second compression stage 112, and a second intercooler 116 is disposed between the second compression stage 112 and the third compression stage 113. Other embodiments can include more or fewer compression stages and some immediately successive compression stages can be directly connected to each other without an intercooler disposed between them. In some embodiments, the compression stages can be compression stages of multiple positive displacement compressor machines operating in parallel or in series.

During compression, the working fluid (e.g., air) is heated due to the increased pressure in the compression stages 111, 112 and 113. This touches upon one of the fundamental issues in the thermodynamic cycles of engines and is the source of a potential inefficiency. In the idealized and theoretical Carnot cycle, this compression is isothermal. Since such isothermal compression is generally not achievable in economically viable engines in the commercial domain, engines in accordance with embodiments of the presently disclosed technology employ the intercoolers 115 and 116 to cool the working fluid between compression stages. The phrase "semi-isothermal compression" is used in the present disclosure to include, as a specific embodiment, this practical "intercooling" approximation to the true isothermal compression of the idealized Carnot cycle. In other embodiments, other techniques can be used to approximate an ideal, isothermal compression process.

The recuperator 150 is configured for preheating the compressed first fluid by providing thermal communication between the compressed first fluid and a second fluid. In the illustrated embodiment, the second fluid is an exhaust fluid from the positive displacement expander 130, supplied to the recuperator 150 via a recuperator heating fluid inlet 156 and an exhaust line 132 from an expander exhaust port or valve 134. In one embodiment, exhaust fluid that has been used in the recuperator 150 is then vented at a recuperator vent 158. In other embodiments, the exhaust fluid can serve other functions after passing through the recuperator 150. For example, the exhaust fluid can be used for space heating (e.g., to heat a building), and/or provide heat in other contexts that extract a useful function from relatively low grade and/or low temperature heat.

The recuperator 150 can be structured to function in any of a number of different ways to preheat the compressed first fluid. For example, the recuperator 150 can include a heat exchanger 159 configured to transfer heat from the exhaust fluid to the working fluid. In one embodiment of the present technology, the recuperator 150 comprises counterflow coiled compressed air tubing in the exhaust stack of the expander 130. In another embodiment, the two fluids may be separated by a wall made of sheet metal or another heat-conductive material to keep them separated from direct fluid contact with each other, while allowing thermal communication, e.g., allowing heat to pass from the hot second fluid to the cooler semi-isothermally compressed first fluid. Accordingly, the recuperator can include first and second flowpaths that are in thermal but not fluid communication with each other.

Recuperation can be a very energy efficient approach to reducing the amount of fuel or heating energy needed to reach the peak temperatures desired in the working fluid before expansion. A common technique for exhaust energy recovery is a turbocharger, in which excess pressure in the exhaust gas is used to propel a compression pump to increase the intake pressures of internal combustion engines. Some thermal energy is extracted from the process of turbo-expansion, but, although the gas often leaves the turbocharging turbine with very high temperatures, it is commonly exhausted to ambient (or occasionally used in cogeneration systems to provide process heat). With a counterflow recuperator strategy, the exhaust heat can transfer a large percentage of its heat to the compressed fluid and any remaining heat can also be harvested when the engine is part of a cogeneration system.

Recuperation is difficult to achieve in conventional internal combustion engines because the compressed air or air fuel mixture is immediately ignited and combusted. When the compression process uses the same displacement device for expansion, there is typically no simple method for redirecting that air to an exhaust heat recuperator. Additionally, the air in a single stage compression process is hotter than with an intercooled or semi-isothermal compression process and that hot compressed air from a single stage compression process is often not substantially cooler than the exhaust gas. Put another way, recuperation cannot add substantially to the compressed air temperature if there was no cooling during the compression process. In general, the hot compressed gas of embodiments of the present disclosure takes more work to provide than if the same pressures were achieved with a process that keeps the average temperatures lower, because the amount of work required is proportional to the volume of the gas and that is proportional to the temperatures of the gas. Recuperation is one technique for recapturing this energy.

The engine system 100 can include a high temperature intake valve 140 at the entrance of the expander 130. One of the benefits of separating the interior of the expander 130 from the interior of the fluid heater 120 via the high temperature intake valve 140 is that it provides considerable flexibility in the choice of the specific technology of the expander 130. For example, the positive displacement expander 130 can include a reciprocating expander 136, and the high temperature intake valve 140 can accordingly control the flow of heated and compressed working fluid into the reciprocating expander 136 from the heater 120.

The overall volume ratio of the compressor 110 to the expander 130 is a function of the desired exit pressure from the expander 130. Expanding to exit pressures higher than ambient external pressures is not as efficient as expanding to ambient pressure, but provides greater power for a given displacement volume in the expander 130. As such, a spectrum of potentially suitable options exists and these possible solutions can be compared to readily available positive displacement machines, or a custom machine can be used. The volumetric ratio of the semi-isothermal compressor's first stage compared to its second stage (or the second stage compared to the third stage) is highly correlated with the pressure ratio achieved in the first of the two stages when intercooling is used. That is, the volume of the fluid leaving the first intercooler 115 is fairly closely proportional to the increased pressure in that first stage if the first intercooler 115 brings the temperature of the first stage intercooled fluid back to near the (e.g., ambient) temperature it had as it entered the first compression stage 111.

As the temperature exiting the first intercooler 115 increases above ambient, the volume of the working fluid leaving increases and this will correlate with the volume needed in the second compression stage 112 of the compressor 110. The mass of the working fluid displaced by a previous stage needs to match the mass ingested by the subsequent stage or process. The varying pressures and temperatures selected by a designer skilled in the art will determine the volume ratios used between each stage. In particular embodiments, a positive displacement machine can ingest a volume of working fluid less than its full displacement. For example, in a reciprocating machine it may do so by opening the intake valve for less than the full 180 degrees of the intake "stroke".

In embodiments for which combustion takes place outside the expansion chamber of the expander 130, one challenge is that the hot high pressure working fluid must be passed from the combustion chamber of the heater 120 into the expansion chamber of the reciprocating expander 130. In a positive displacement expander, the flow of the working fluid must generally be started and then stopped intermittently. Accordingly, embodiments of the present technology include the high temperature valve 140.

When employing gas as a working fluid, the desired temperature of the combustion gas is typically as high as practical since higher efficiencies are obtainable at higher temperatures. These temperatures can be above 1200 K, 1400 K, 1600 K, 1700 K, 2000 K, 2400 K, or 2800 K. These temperatures will generally damage unprotected metals. Additionally, the working fluid flow rate through the high temperature intake valve 140 can be high when the pressure in the expansion chamber of reciprocating expander 136 is substantially below that of the hot working fluid. The challenge is for the intake valve 140 to survive this damaging flow of hot pressurized fluid. Accordingly, in at least some embodiments, the structure of the intake valve 140 can be insulated from the hot working fluid and/or actively cooled. Further details are described later with reference to FIGS. 8-10D.

The exhaust valve 134 at the expander exit controls the flow of the working fluid exiting the expander 130. Because the fluid at the expander exit is cooler than at the expander entrance, the exhaust valve 134 may not require the same level of heat tolerance as the intake valve 140. By tailoring the time at which the exhaust valve 134 closes, the remaining working fluid in the displacement cavity of the expander 130 can be compressed up to near the pressures in the combustor 120. For example, if the expander 130 includes a piston, the exhaust valve 134 can close as the piston completes the last part of what would be considered the exhaust stroke in the standard use of a similar engine block. This timing can be selected to reduce the pressure difference between the combustion chamber of heater 120 and the expansion chamber of the expander 130, thereby lowering flow velocities, the associated heat transfer rate, and erosive dynamics as the intake valve 140 opens. The process for regulating the timing of the intake valve 140 can be controlled with simple conventional valve timing techniques, e.g., with the valves driven via a mechanical linkage between the crank/drive shaft and a valve actuation mechanism, and/or the timing can be computer-controlled with a processor programmed with specific instructions for performing the valve timing function. Similar arrangements can be used to control an intermittent combustion process at the combustor.

Sensors can be used for evaluating the exhaust working fluid and other operating parameters. These can be fed to one or more microcontrollers which can modulate a variety of parameters, for example, fuel flow to the heater 120. The heating process typically comprises adding fuel to the compressed first fluid (e.g., the working fluid) and operating a suitable combustion process. Controlling the flow of fuel is typically the primary throttling technique for changing the power level of the system.

In configurations utilizing combustion (e.g., continuous, quasi-continuous and/or intermittent combustion) separate from the expander 130, the combustion operates in a mode more independent of the timing requirements imposed on internal combustion engines. Accordingly, the combustor 120 can be relatively simple with very few if any controls. Other embodiments include more elaborate designs. Some designs for combustor 120 allow the combustion techniques and/or parameters to change, e.g., by pre-mixing the reactants, adjusting flow pressures, and/or altering orifice size. Altering such parameters changes the temperature and/or chemistry of the post-combustion gas with the effect of changing temperature and/or changing emissions of $NO_x$, CO, and/or unburned hydrocarbons. In at least some of these embodiments, the combustor has an uninterrupted (e.g., non-valved) inlet and is positioned to provide a continuous flow of combustion products to the expander, over multiple expander cycles. This is unlike a conventional internal combustion engine, which provides separate quantities of combustion products, one for each expansion cycle.

Changing the timing of the intake valve 140 can alter the system operating characteristics, for example, by altering the operating pressure or the time at which the positive displacement cavities are opened to different plenums or passageways. The details of how quickly a valve opens and closes as well as how gases flow through its opening will affect the valve timing. Furthermore, changes in external environment or control setting (e.g. throttle setting) can alter the pressures of the working fluid at various points throughout the system. As such, it can be beneficial to alter the timing of the operation of valve 140. Suitable techniques include those presently used in internal combustion machines, e.g., altering the "clocking" position of a valve actuation system shaft. In a typical poppet valve design, this process includes "clocking" the camshaft with respect to the crank shaft position, or similarly with a rotary valve, "clocking" the angular position of the valve body. One simple way to do this is with an adjustable idler pulley in the cam/valve drive belt or chain to bias the angular positions. Newer technology permits fine dynamic manipulation of the valves through electronic control or hydraulic actuation. Other control parameters that can be employed to monitor and control the engine include, but are not limited to, operating temperatures, lubricant flow and safe operating limits.

In several embodiments of the present technology, the positive displacement expander 130 can be configured to drive the semi-isothermal compressor 110 by, for example, putting both units on the same shaft or by driving the semi-isothermal compressor 110 via a belt. In other embodiments, the semi-isothermal compressor 110 can be driven with a separate source of motive power. In particular embodiments, the expander 130 can be coupled to a generator to generate electricity, and the compressor 110 can be coupled to an electrically-powered motor that receives electrical current from the generator or from another power supply, e.g., in energy storage embodiments. Arranging the motor/generator between the compressor and expander, e.g., with a clutch or direct drive mechanism, can allow operating modes where only compression or only expansion occurs at a given point in time, e.g., by utilizing or creating stored compressed fluid. This arrangement can also facilitate modes where both compression and expansion processes occur simultaneously, but each has a different mass flow rate and correspondingly different power than when operating with equal mass flow rates.

The system 100 can also include a regenerative cooling device 160. Regenerative cooling refers generally to a process in which a fluid is used to cool a system element and the coolant is then introduced into the working fluid or other process flow after the cooling process. Film cooling is a particular example in which cooler fluid is directed between a hotter fluid flow and the enclosure surrounding that flow, so as to reduce the average temperature of the fluid along surfaces of the enclosure. The injected fluid becomes part of the overall working fluid. In another embodiment, the cooling fluid is separated from the hotter fluid by a solid boundary. Once the cooler fluid is heated via its proximity to the solid boundary, it can be introduced into the hotter flow, e.g., the working fluid.

The regenerative cooling fluid can be directed to a number of sites before being reintroduced into the working fluid. The fluid can be directed to single sites, and/or can be directed to multiple sites in parallel, and/or can be directed to multiple sites in series. Representative sites include the combustor, the recuperator, the expander and/or the compressor. In a particular embodiment show in FIG. 1, the regenerative flow is directed to the expander and/or the combustor for cooling, and, once heated is redirected into the working fluid upstream of the combustor. While the regenerator is shown schematically as a separate device in FIG. 1, it can be integrated with the device it cools, e.g., in the form of active cooling passages, as is described later with reference to FIGS. 9A-11C.

Figure 2:
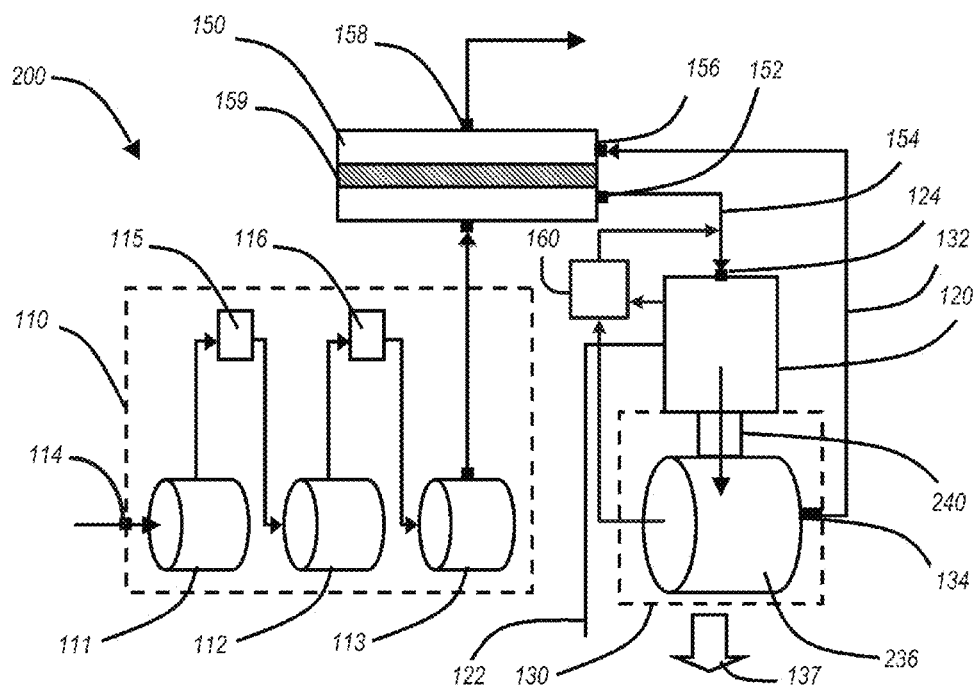
FIG. 2 illustrates another embodiment of an engine according to the presently disclosed technology.

FIG. 2 schematically illustrates a further embodiment of a representative engine system 200 in accordance with the present technology is shown. Components that are identical to or generally equivalent to those shown in FIG. 1 are labeled with the same reference numbers. In this embodiment, the positive displacement expander 130 comprises a rotary expander 236 coupled to a valveless port 240. The rotary expander 236 is a positive displacement machine in which a spinning rotor creates variable volume chambers. Examples of this arrangement include the Wankel cylinder configuration or a rotary vane pump. Other subsystems of the engine can be similar or identical to that of the embodiment in FIG. 1 and can function in similar or identical ways. A particular feature of the embodiment in FIG. 2 is that the rotary expander 236 can have one or more rotary members and can performs its own intake valving by means of one or more of its own rotary members. The requirement for a high temperature intake valve is thereby obviated in this embodiment. One non-limiting example of a suitable rotary expander 236 is the two lobe bi-directional rotary expander described in U.S. application Ser. No. 13/038,345, the specification of which is hereby incorporated by reference.

Figure 3:
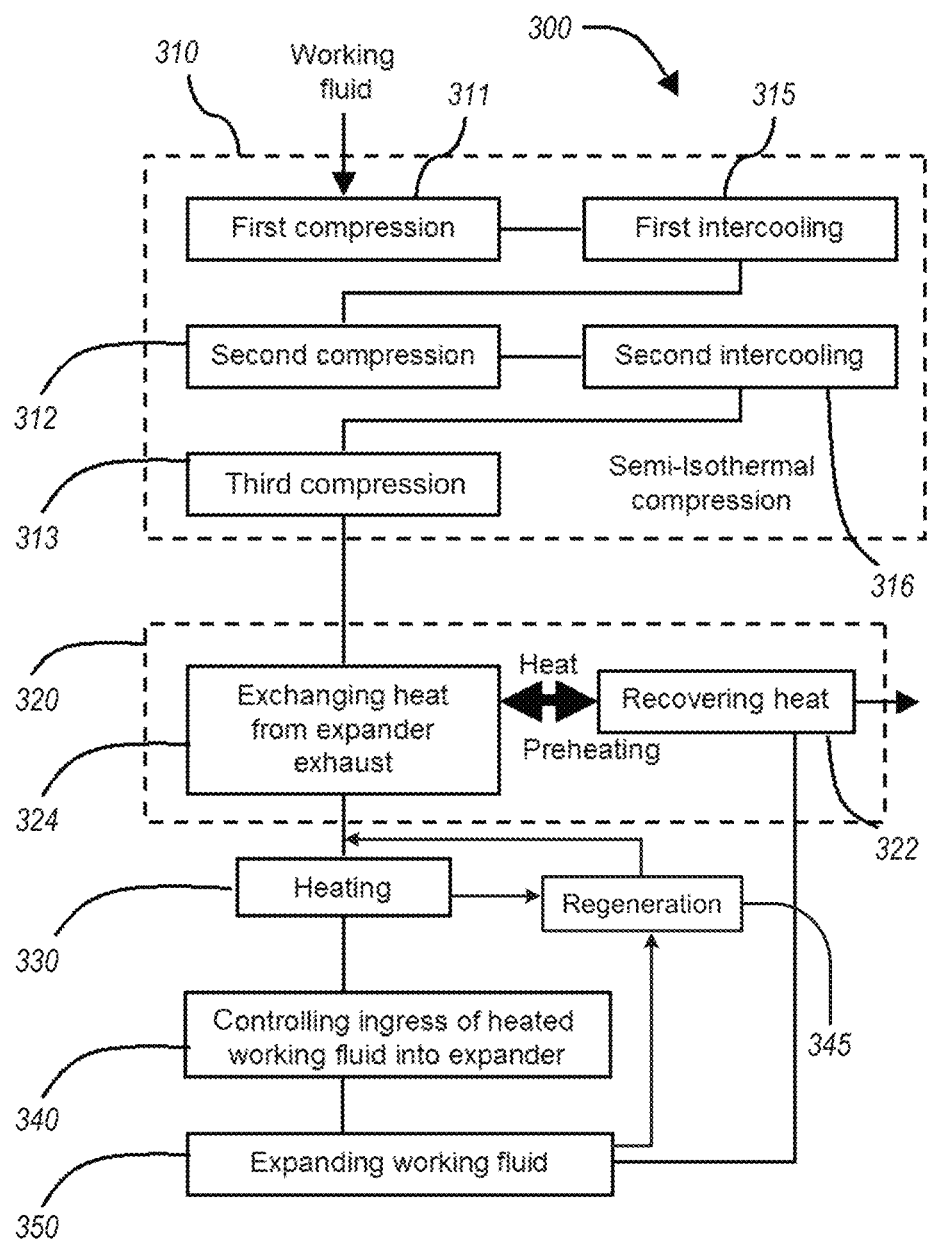
FIG. 3 illustrates a flow diagram of a method for converting energy using an engine in accordance with the presently disclosed technology.

FIG. 3 illustrates a process 300 in accordance with a further aspect of the present technology for generating power from a fuel. The process, described here with reference to the apparatus of FIG. 1, comprises semi-isothermally compressing a working fluid (process portion 310) in a compressor (e.g., the compressor 110 shown in FIG. 1). Process portion 320 includes preheating the compressed working fluid (e.g., in the recuperator 150) and process portion 330 includes heating the compressed working fluid (e.g., in the heater 120) by adding a fuel to the working fluid and combusting the resulting mixture. Process portion 340 includes controlling an ingress of the compressed and heated working fluid (e.g., from the heater 120) into an expansion chamber of an expander (e.g., the reciprocating expander 136) through the use of high temperature intake valve. Process portion 350 includes expanding the heated and compressed working fluid. Preheating the working fluid (process portion 320) uses the heat of the exhaust working fluid. Controlling the ingress of heated and compressed working fluid into the expander (e.g., through a high temperature intake valve) can take place at temperatures in excess of 1200 K. Under some circumstances it can take place at temperatures in excess of 1400 K, e.g., 1700 K, 2000 K, 2400 K or 2800 K. In the case of the apparatus of FIG. 2, the method is at least generally similar except with respect to the expansion process (process portion 350) and the controlling process (process portion 340). For example, process portion 350 can occur in a rotary expander and process portion 340 can occur within the rotary expander itself, there being no intake valve 140 in the embodiment shown in FIG. 2. Process portion 345 includes regenerating heat, e.g., by delivering a cooling fluid to the heater and/or expander and returning the cooling fluid to the overall process flow, e.g., upstream of the heater.

In the example embodiments shown in FIGS. 1, 2 and 3, the working fluid can be air and serve as a second reactant (in addition to the fuel at the combustor). In a more general embodiment of the present technology, the generation of the heat can be external to the working fluid cycle.

Semi-isothermally compressing the first working fluid (process portion 310) can comprise compressing the working fluid in a plurality of compression stages while intercooling the compressed working fluid in between compression stages. In one embodiment, shown in FIGS. 1, 2 and 3, the semi-isothermal compressing process comprises a first compressing process (process portion 311) in the first compression stage 111, a first intercooling process (process portion 315) in first intercooler 115, a second compressing process (process portion 312) in second compression stage 112, a second intercooling process (process portion 316) in the second intercooler 116, and a third compressing process (process portion 313) in a third compression stage 113.

The preheating process (process portion 320) can include recovering the heat from the expander exhaust (process portion 322). The heat recovered in process portion 322 is directed to the recuperator 150 for preheating the compressed working fluid by exchanging heat before the working fluid enters the heater 120 (process portion 324).

In the examples of FIG. 1 and FIG. 2, the fuel is combusted with the air that forms the working fluid. Accordingly, despite the interior of the heater 120 being separated from the interior of the expander 130, these two components remain in intermittent fluid communication via the intake valve 140 (FIG. 1) or the port 240 (FIG. 2). Thus, engines in accordance with embodiments of the presently disclosed technology are in principle internal combustion engines in that the combustion occurs within the working fluid, albeit not within the expansion chamber of the expander, as in most internal combustion engines. In other embodiments, the heater 120 can be externally heated so that the fuel and the working fluid remain separated.

Embodiments of the presently disclosed technology include multiple ways to heat the first fluid, e.g., air. Many of the embodiments discussed herein including combusting the compressed air with a fuel, with the products of that combustion then flowing into the expander as discussed above. The fuels could be gaseous (e.g. natural gas or propane, syngas), liquids (e.g. gasoline, diesel fuel or bunker oil) or even solids (e.g. biomass/wood, coal, coke, charcoal).

The use of solid fuels generally results in ash and other materials that may deposit on the expander surfaces. In general, positive displacement machines can be more tolerant of these deposits than aeromachines, which typically spin at high speeds (and can accordingly suffer from small deposit-induced imbalances) and have cooling channels (which can become blocked with soot).

An alternative for some combustion techniques, particularly solid fuels, is to combust the fuel in a separate cavity and transfer the heat across a partition dividing the compressed air from the combustion products. For example the boiler of a coal power plant transfers heat from the combustion gas into the high pressure water tubes that carry the working fluid. A similar strategy can use air inside the tubes instead of water. The challenge is the maximum temperatures that can be imparted to the compressed air due to materials limitations or cost of the heat transfer wall. In addition, such temperatures are generally lower than those obtained from combusting inside the same gas that is to be expanded. However, solid fuels are often much less expensive and/or more available than gaseous or liquid fuels, making the lower peak temperatures and associated lower thermodynamic efficiency an acceptable tradeoff in at least some embodiments. Other representative sources of heat include solar heat, or waste heat from an industrial process.

The intercooling process described above increases the power efficiency of the engine. One of the reasons for this is that it reduces parasitic compression. Intercooling in internal combustion engines is known as a method for increasing power for a given displacement, typically in conjunction with turbo- or supercharging. Turbo- and supercharging are generally used to harvest the excess energy in the exhaust of underexpanded flow, inherent in typical internal combustion engines, to increase the pressure of the engine. That is, the extra power that this design harvests with a more complete expansion is used to increase power. In a typical internal combustion engine, where compression and expansion occur in the same cylinder, the combustion products are expanded to greater than ambient pressure and there may be extra energy efficiency to be gained from further expansion. In an engine where compression and expansion occur in different volumes, such as in embodiments of the presently disclosed technology, there is generally no efficiency benefit to turbocharging, as the energy consumed by the turbocharger is removed from the expander output, and maximum expander output occurs when the exit pressure is that of external ambient.

In a standard internal combustion engine in which the final compression stage, combustion, and expansion all occur within the same cylinder and with intricate timing, there is generally no easy way to provide waste heat to the reactants after the last compression stage and immediately before combustion. Separating the compression volume from combustion volume enables the system to pre-heat the cooled compressed air. By combining in the engine of the presently disclosed technology, the intercooling in the compressor 110 with recuperation in the recuperator 150, the compression work can be reduced by 15% to 25%. This results in significant energy efficiency gains, e.g., up to 25%.

The first compression stage 111 of compressor 110 determines the flow rate of the air as working fluid through the engine up to the point of the heater 120. In the engine of the presently disclosed technology, the expander 130 can be independently optimized for the increased volume and flow of the working fluid after the heating process conducted in the heater 120. The expansion ratio in the expander 130 can therefore be matched to the heated air from the heater 120. This is the source of a further gain in efficiency, approaching 25%. This is again difficult or not feasible to manage in standard internal combustion machines where compression, heating and expansion all occur in the same chamber.

Systems somewhat similar to those of the presently disclosed technology have been proposed for turbomachines. Such systems typically include a combustor positioned between a rotary turbo compressor and a rotary turbo expander, e.g., as used in an aircraft gas-turbine engine. One difference between such systems and the present technology is that embodiments of the present technology include positive displacement machines in which discrete volumes of working fluid are compressed or expanded. In contrast, turbo machines, such as typical gas turbine engines are continuous flow machines. Positive displacement expanders/compressors are typically less expensive per unit power and have higher expansion and compression process efficiencies. Although such machines require managing intermittent flow, this challenge is addressed by tailoring the timing of the intake and exhaust flow periods with respect to the previous and subsequent processes, along with the use of suitable volumes in the interstitial flow passageways to buffer the flow changes. Positive displacement machines in general can tolerate higher peak gas temperatures (as that is common in internal combustion engines) and this is due to the expander components experiencing an average of the peak temperature and the exhaust temperature (and often the cooler intake and compression stages as well). The use of insulation is typically much easier to implement in PDMs. One challenge with implementing PDMs for this cycle is associated with cooling the valve for reciprocating machines, and thermal management of parts in a rotary style PDMs. Representative cooling techniques for reciprocating devices are described later with reference to FIGS. 9-11C.

The following examples provide representative timing arrangements. If a system includes six first stage compressor cylinders feeding two second stage compressor cylinders, the first stage cylinders can be arranged on a crankshaft to operate 60 degrees of phase apart from each other, which smooths the intake and exhaust from all of the cylinders. The two second stage cylinders can be timed 180 degrees of crank angle from each other to have one or the other of the cylinders in an intake mode substantially all the time (depending on whether the intake stroke is a full 180 degrees of crank angle). The time or angle period of output from any of these compression cylinders will vary with the compression ratio. That is, if the pressure ratio is ten, the period of discharge will be shorter than if the pressure ratio is two. So with shorter discharges on compression cylinders there may be periods of time where there is no discharge flow.

More cylinders operating in parallel in a stage will help smooth out flow periodicity. Furthermore, increasing the enclosed gas volume in between these intermittent flow sources and sinks will reduce the pressure oscillations. The flow from the compression process to the expansion process includes a recuperator and injection into the combustor/heater and then into a hot gas manifold where it then flows through the hot gas valves in the expansion cylinders. The volumes of the recuperator and the hot gas manifold can act as accumulators, smoothing the pressure oscillations due to second stage compressor discharge pulses with the flow into the heater and subsequently into the expansion cylinders.

The relatively small number of second stage compression cylinders creates the least uniform flow rates in this example. Depending on the pressure ratio, the discharge durations may be only 80 degrees of crank angle each. These two eighty degree periods can be clocked 180 degrees apart, but this still leaves 200 degrees of crank angle with no flow from the compression process. The expansion flow can be smoothed over the full 360 degrees as described above, or in another embodiment, the expansion flows can be timed (e.g., with cam and/or rotary valve orientations) to be not evenly distributed, but concentrated near the high flow periods coming from the compressor. If the expander intake flows are arranged to correlate well with the second stage compressor discharge flows, then this can also reduce pressure oscillations in the recuperator and hot gas manifold. The main effect of this approach is to create non-steady flow into the heater. That is, the pressures may be fairly steady but the flow rate through the heater will vary. By taking advantage of available variables, including the compressor and expansion crank angle and cylinder operation timing, valve open and closing timing, the volumes of the interstitial flow passageways, and the orifices or flow control features in the heater, the detailed design process can produce a wide spectrum of flow steadiness of various phases of the overall process.

Reciprocating machines can achieve very high compression/expansion efficiencies if the intake valve is properly sized. In accordance with embodiments of the present technology, the choice of a positive displacement expander along with a suitable high temperature intake valve, or the use, as in FIG. 2, of a rotary expander that requires no intake valve, therefore also support attaining higher efficiencies. Reciprocating or positive displacement machines (PDM) in general can have less loss per unit of compression or expansion compared to turbomachines if the flow ports are sized appropriately and the timing of the flow is carefully managed. Turbomachines necessarily operate with high tip speeds and the friction generated in the boundary layers of these high speed flows is difficult to eliminate. Lowering the turbomachine tip speeds simply makes them very expensive per unit power. Accordingly, and as discussed above, positive displacement machines can be more efficient if the flow intermittency is properly managed. At the same time, thanks to economies of scale and less stringent materials requirements, commercial positive displacement expander systems are available at much lower unit cost than turbines.

Separating the heater 120 from the expander 130 and compressor 110 furthermore allows significantly increased freedom of choice when selecting the heater 120. For example, the heater can include combustion or no combustion. When the heater includes combustion, the combustion process can be continuous. This is substantially different than typical prior art internal combustion engines which typically require intermittent combustion. Having combustion take place outside the volume of the expander, e.g., in a continuous manner, allows for a more optimal burn, which can be more efficient, and which can produce reduced emissions across a broad range of power output levels. The separation of the heater 120 also provides greater freedom in the choice of fuel. In particular, it allows for the use of low cost natural gas while avoiding the efficiency-limiting challenges of limited pressure ratio in spark-ignited engines, or fuel injection and ignition challenges in compression ignited natural gas engines. It also allows the use of leaner fuel mixtures or fuels of inconsistent and lower quality, both of which are particular problems for today's internal combustion engines.

The combined result of the intercooling, recuperation and expansion improvements (e.g., optimizations) employed in the present technology is a net efficiency that can be 20% to 50% higher than that achievable in comparable high efficiency internal combustion engines. In this respect, the net energy efficiency of such high efficiency internal combustion engines is of the order of 30-45% while the present technology can deliver energy efficiencies of the order of 45-65%. Table 1 below illustrates expected cycle efficiencies for an engine that includes a two-stage intercooled compressor, a combustor, a positive displacement expander, and post-expansion recuperation. The peak pressure is generally measured at the entrance of the expander. The effectiveness of the insulation and/or regenerative cooling depends upon factors that include insulation thickness and efficiency, cooling flow rates and temperatures, among others. Further details are described later with reference to FIGS. 9A-11B. In general the efficiencies can exceed 40%, 45%, 50%, 55%, 60% or 65% depending upon the particular embodiment.

TABLE 1

| Peak Pressure (bar) | Combustion Temp (K) | Regen/insulation Effectiveness (% of ideal) | Expected Cycle Efficiency |
|---|---|---|---|
| 6 | 1700 | 50% | 49.4% |
| 20 | 1700 | 50% | 49.3% |
| 50 | 1700 | 50% | 45.5% |
| 20 | 1700 | 75% | 53.8% |
| 20 | 1700 | 0% | 41.5% |
| 20 | 2000 | 50% | 55.6% |
| 20 | 2400 | 50% | 61.8% |

Heat can be provided to the working fluid upstream of the expander or, in other embodiments, within the expander. Accordingly, while several embodiments were described above in the context of separate compressors, combustors and expanders, in at least some embodiments, the compressor and expander are separate, but the combustor is integrated with one or the other. Advantages associated with combining the combustor with the expander (e.g., combusting the working fluid in the expander) include eliminating the need for a separate combustor, and/or achieving higher pressures (so as to reduce the demands on the compressor). While the combustion process within the expander may not be optimal form some perspectives (e.g., the constituent product stream), the foregoing advantages can outweigh these factors in at least some embodiments. When the expander is combined with the combustor, combustion can be provided by spark ignition, compression, and/or other forms of ignition.

Table 1 reflects an analysis wherein the combustion process does not significantly add pressure to the compressed and recuperated air, e.g., the combustion process is performed outside the expander. In other embodiments, the combustion process can increase the pressure. One method includes performing the combustion process in the expander after closing an intake valve, as described above. When the working fluid is heated in an enclosed, fixed volume, the pressure will rise generally in proportion to the temperature rise. Internal combustion engines have this effect and the magnitude of the effect is correlated with the speed of the combustion process relative to the speed of the expansion process. This effect is particularly evident in low-speed diesel engines such as those used in marine applications. By slowing down the expander, a pressure boost is provided purely by the heating process without the parasitic work required to mechanically compress the air/fluid. Reciprocating machines in particular and to different degrees other PDM machines typically need to be slowed as they increase in size, due to physical limits resulting from increased stroke, higher speeds and higher accelerations when components change direction. As power requirements increase, displacement increases, and eventually the rotational speed has to be lowered to keep the accelerations reasonable. This is one reason why the high power PDM machines are generally operated more slowly. The efficiency boost resulting from the combustion process completing noticeably faster than the expansion process results in increased pressure, which is some economic mitigation for the general problem that large PDMs require more displacement per unit power because the speeds must be lowered.

Table 2 below indicates the effect of this pressure boost for the technology disclosed herein, assuming the heat addition is completed before any substantial expansion occurs. This can be accomplished via embodiments generally similar to those discussed above, but by injecting the compressed working fluid with the chemical reactants (nominally air with a hydrocarbon fuel) into the expansion chamber near minimum displacement, and having the combustion occur in the expander while all valves or ports are closed. There is a considerable thermodynamic efficiency benefit to this technique which is expected to be worthwhile embodiment for some applications.

TABLE 2

| Post Compression Pressure (bar) | Post Combustion Pressure (bar) | Post combustion temperature (K) | Regen/Insulation effectiveness (%) | Efficiency (%) |
| --- | --- | --- | --- | --- |
| 6 | 15 | 1700 | 50% | 60.9% |
| 8 | 23.5 | 1700 | 50% | 61.1% |
| 10 | 33.4 | 1700 | 50% | 60.9% |
| 15 | 64.2 | 1700 | 50% | 60.1% |

TABLE 2-continued

| Post Compression Pressure (bar) | Post Combustion Pressure (bar) | Post combustion temperature (K) | Regen/Insulation effectiveness (%) | Efficiency (%) |
| --- | --- | --- | --- | --- |
| 20 | 99 | 1700 | 50% | 59.1% |
| 6 | 14.3 | 2000 | 50% | 65.3% |
| 8 | 22.1 | 2000 | 50% | 65.5% |
| 10 | 31.2 | 2000 | 50% | 65.4% |
| 15 | 58.9 | 2000 | 50% | 64.8% |

Figure 4:
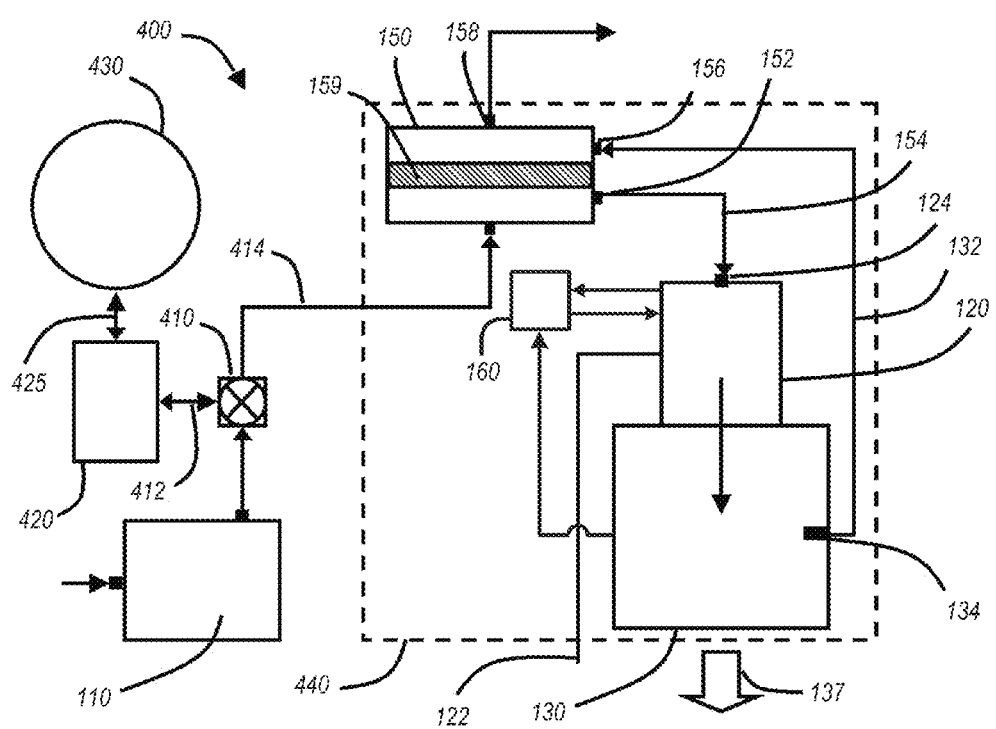
FIG. 4 illustrates an energy conversion and storage system in accordance with an embodiment of the presently disclosed technology.

FIG. 4 illustrates an energy conversion and storage system 400 configured in accordance with a further aspect of the present technology. The system 400 includes many of the same elements described above with respect to the embodiments shown in FIGS. 1 and 2, all bearing the same numbering as in FIGS. 1 and 2. For the sake of clarity, various elements of the embodiments in FIGS. 1 and 2 are grouped together as an energy extraction subsystem 440. The overall system 400 further comprises a multiway directing valve 410, a fluid storage compressor 420 operably configured for further compressing the compressed first fluid to a storage pressure, and a high pressure fluid storage volume 430 for storing the further compressed first fluid at the storage pressure. The directing valve 410 is disposed in a high pressure fluid line 414 between the semi-isothermal compressor 110 and the recuperator 150 and is operably configured for selectively (a) directing compressed first fluid flowing in the high pressure line from the semi-isothermal compressor 110 to the recuperator 150 along the high pressure line 414, (b) directing compressed first fluid from the semi-isothermal compressor 110 along a bidirectional high pressure line 412 to the high pressure fluid storage compressor 420, or (c) directing stored compressed first fluid from the high pressure fluid storage volume 430 arriving via the bidirectional high pressure line 412 to the recuperator 150 via the high pressure line 414.

Semi-isothermally compressed first fluid arriving at the high pressure fluid storage compressor 420 via the directing valve 410 is compressed to a suitable storage pressure by the fluid storage compressor 420, and is directed along a bidirectional high pressure line 425 to be stored at the storage pressure in high pressure fluid storage volume 430. The storage volume 430 can include one or more tanks, a subterranean cavern, and/or one or more submarine enclosures or other compressed gas storage media. In particular embodiments, the storage volume 430 is insulated, e.g., to avoid the loss of heat energy imparted to the fluid during compression. In any of these embodiments, semi-isothermally compressing the first fluid can obviate the need for other system elements. For example, such systems can eliminate the need for a turbo-charger while still producing sufficient power at high efficiency levels.

The first fluid stored at the storage pressure in the high pressure fluid storage volume 430 can be released into the energy extraction subsystem 440 for the extraction of energy. In one embodiment, the high pressure fluid storage compressor 420 can be fitted with a bypass valve (not shown). The bypass valve allows the first fluid under storage pressure to flow past high pressure fluid storage compressor 420 and along the bidirectional high pressure line 412 to the multiway directing valve 410. Under such stored high pressure fluid retrieval conditions, the multiway directing valve 410 is adjusted to direct the high pressure first fluid along the high pressure line 414 to the recuperator 150. From this point onwards, the first fluid is subjected to energy extraction in the energy extraction subsystem 440. The process of energy extraction is similar or identical to that already described above and can comprise preheating the fluid in the recuperator 150, heating the preheated fluid in the heater 120, controlling the ingress of the heated first fluid into the expander 130 via the use of either a high temperature intake valve or via the one or more members of a suitable rotary expander, expanding the heated compressed first fluid in the expander 130 to perform work, and directing the exhaust fluid from the expander 130 to the recuperator 150, where the exhaust fluid is used to preheat the high pressure first fluid from multiway directing valve 410.

In another embodiment of the present technology, the fluid storage compressor 420 is configurable between a variety of different operating modes. The system 400 can be operated such that it is only compressing, only expanding or expanding and compressing simultaneously. The particular operation mode can be selected in response to signals to the system from electrical grid operators, or algorithms designed to provide, absorb or deliver extra power at certain times or conditions. In another embodiment, a user can provide real time commands to alter the configuration independently of a program. The description of its function above represents the compression configuration. In an expansion configuration, first fluid at storage pressure is released from high pressure fluid storage tank 430 along the bidirectional high pressure line 425 to the fluid storage compressor 420, where it is expanded and the fluid storage compressor 420 is used to perform work. Accordingly, the storage compressor 420 can operate in reverse (e.g., as an expander) and in doing so, can extract additional energy, e.g., in the form of shaft power. In one embodiment, the expanded air is vented. Under these conditions, the multiway directing valve 410 can be user-configured or automatically operated to isolate the semi-isothermal compressor 110 and the energy extraction subsystem 440 from the fluid circuit comprising the fluid storage compressor 420 and the high pressure fluid storage volume 430, and the bypass valve in fluid storage compressor 420 is shut. In another embodiment, the working fluid from the storage volume 430 is only partially expanded (through the storage compressor 420) and exits at a pressure high enough to pass to the energy extraction subsystem 440 via the high pressure line 414. For example, the working fluid can be expanded through the storage compressor 420 to have approximately the same pressure it would have after exiting the semi-isothermal compressor 110.

Figure 5:
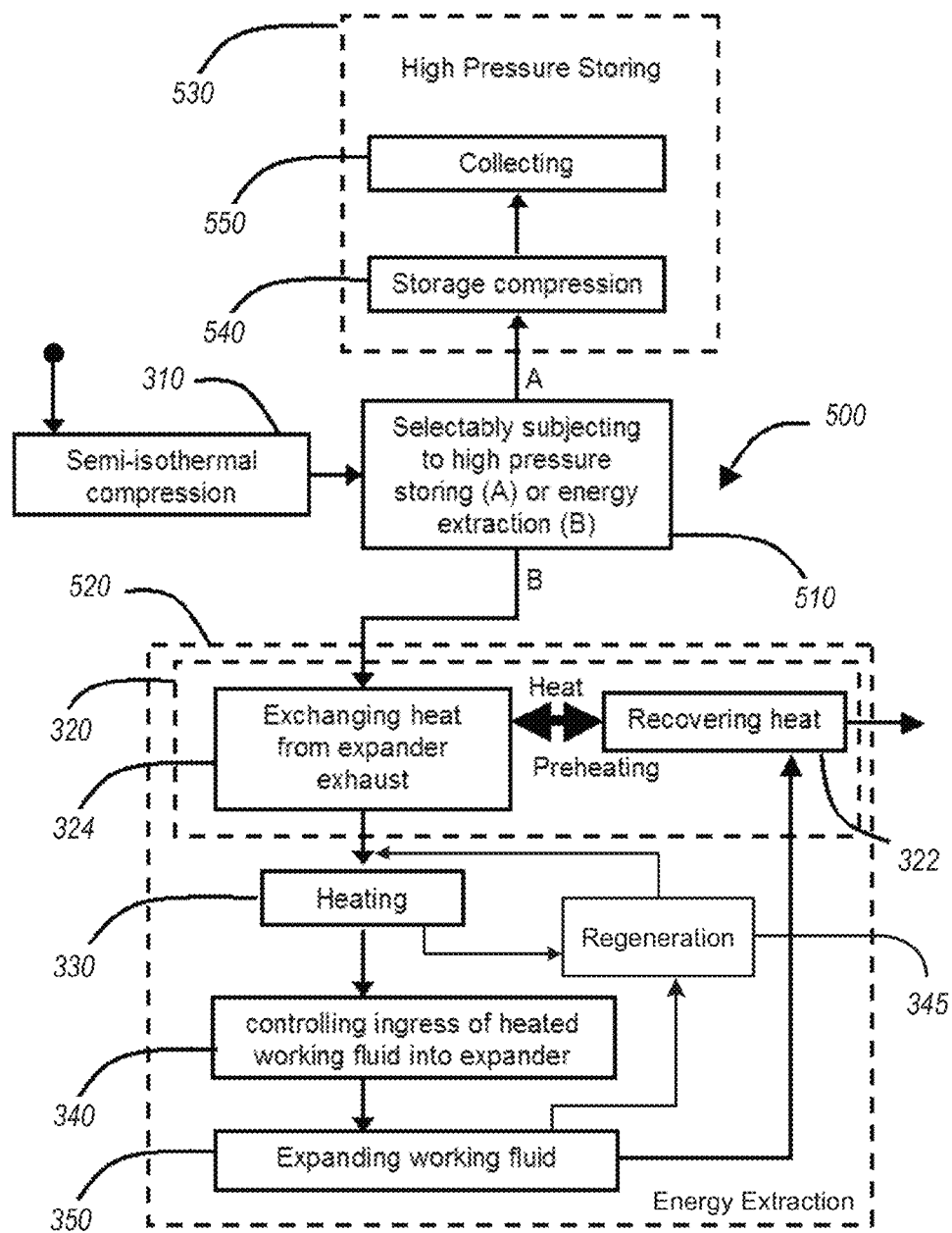
FIG. 5 illustrates a flow diagram of a method for converting energy in accordance with an embodiment of the presently disclosed technology.

FIG. 5 illustrates a method 500 for converting energy in accordance with a further aspect of the present technology. The method 500 can include semi-isothermally compressing a first fluid (process portion 310) e.g., in a semi-isothermal compressor 110. Process portion 510 includes selectably subjecting the compressed first fluid to one of energy extracting (process portion 520) e.g., in energy extraction subsystem 440, and a high pressure storing (process portion 530) e.g., at the fluid storage volume 430. Process portion 510 can be performed by the multiway directing valve 410. Process portion 530 can include storage compressing (e.g., further compressing) the first fluid from the semi-isothermal compressor 110 (process portion 540) and collecting the first fluid at a storage pressure (process portion 550) e.g., in the high pressure fluid storage volume 430. Additionally, the exhaust fluid after leaving the recuperator 322 can be used to warm the working fluid, e.g., with heat exchangers in or around the expander and/or the fluid collecting/storage system. Also, the energy of compression can be captured and stored in a thermal energy media (e.g. water, solids or even the heated air itself) and that heat can be made available in the expansion process. That is, a stepwise adiabatic compressed air energy storage (CAES) system with thermal energy storage can be used as a part of a broader energy system that also converts the pressurized air to shaft power at high efficiencies as described above and generally denoted as process portion 520.

Process portion 520 can include the processes already described with respect to FIGS. 1, 2 and 3, namely preheating the compressed working fluid e.g., in the recuperator 150 (process portion 320); heating the compressed working fluid, e.g., in the heater 120 by reacting a fuel with at least one second reactant (process portion 330); controlling an ingress of the compressed and heated working fluid from the heater into an expansion chamber of expander, and expanding the heated and compressed working fluid in the expander (process portion 340); and expanding the working fluid to produce work (process portion 350).

Figure 6:
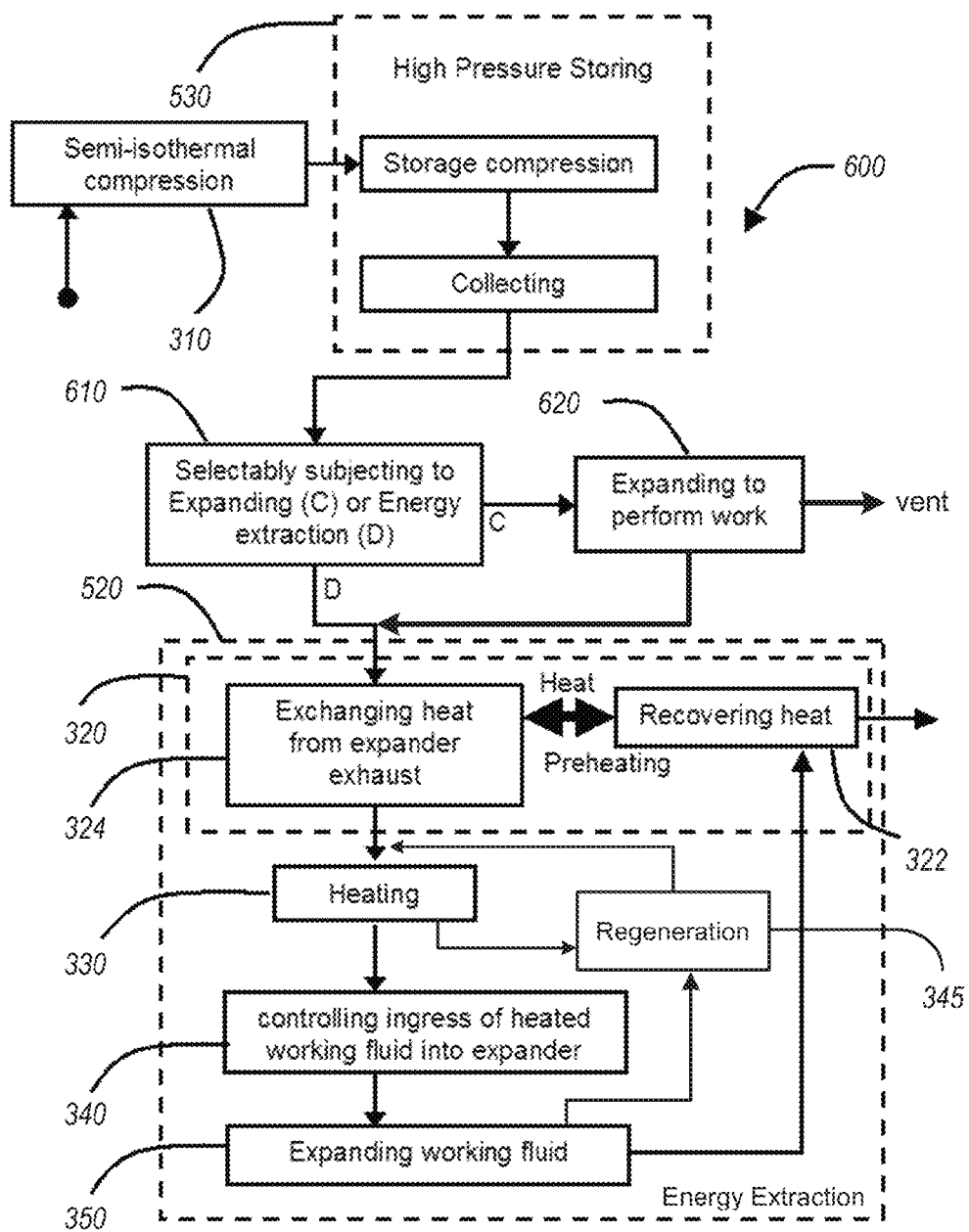
FIG. 6 illustrates a flow diagram of a another method for converting energy in accordance with an embodiment of the presently disclosed technology.

FIG. 6 illustrates a method 600 for converting energy in accordance with a further aspect of the present technology. The method 600 can include semi-isothermally compressing a first fluid, e.g., in a semi-isothermal compressor 110 (process portion 310) and high pressure storing the semi-isothermally compressed first fluid at a storage pressure e.g., in fluid storage volume 430 (process portion 530). Process portion 610 includes selectably subjecting the compressed first fluid to one of energy extracting process 520 (e.g., in the energy extraction subsystem 440) and an expansion process 620 (e.g., in the fluid storage compressor 420). If additional energy remains in the expanded fluid resulting from process portion 620, the fluid can then undergo the energy extraction process 520. For example, a stepwise adiabatic CAES system without external heat addition (by combustion or other source beyond that of the heat of compression) can be operated independently from the energy extraction process 520, or in series with it, depending on whether the final expansion is all the way to ambient pressure, or to the inlet pressure of process portion 520. Otherwise the fluid can be vented without further energy extraction.

The energy extracting process 520 can include the processes already described with respect to FIGS. 1, 2 and 3, namely preheating the compressed working fluid e.g., in the recuperator 150 (process portion 320); heating the compressed working fluid by reacting a fuel with at least one second reactant (process portion 330); controlling an ingress of the compressed and heated working fluid from the heater into an expansion chamber of an expander (process portion 340); and expanding the heated and compressed working fluid in an expander (process portion 350); wherein the preheating uses the heat of the exhaust working fluid from the expanding process.

Designs based on the presently disclosed technology can incorporate multiple compression stages in the semi-isothermal compressor 110, which generally requires considerably more displacement volume for the first compression stage than the second or subsequent stages, and the expander 136 generally requires considerably more displacement volume than the compressor 110 due to the heating and volumetric expansion of the working fluid. These considerations imply a relatively large number of pistons, if using reciprocating positive displacement machines.

In a particular embodiment of the present technology, a modified cylinder assembly of a commercial V-8 diesel engine functions very well as the reciprocating expander 136. The ability to employ such standard commercial subsystems is of significant value in the practical implementation of the present technology in different commercial embodiments. One example uses three V-8 engine blocks. Six cylinders from one V-8 block are used for the first compression stage, and the two remaining cylinders are used for the second compression stage. The other two V-8 engine blocks provide 16 cylinders of expansion. Other examples utilize blocks with larger piston displacements for the expander 136 than for the semi-isothermal compressor, or use two different blocks for the two stages of compression.

Figure 7:
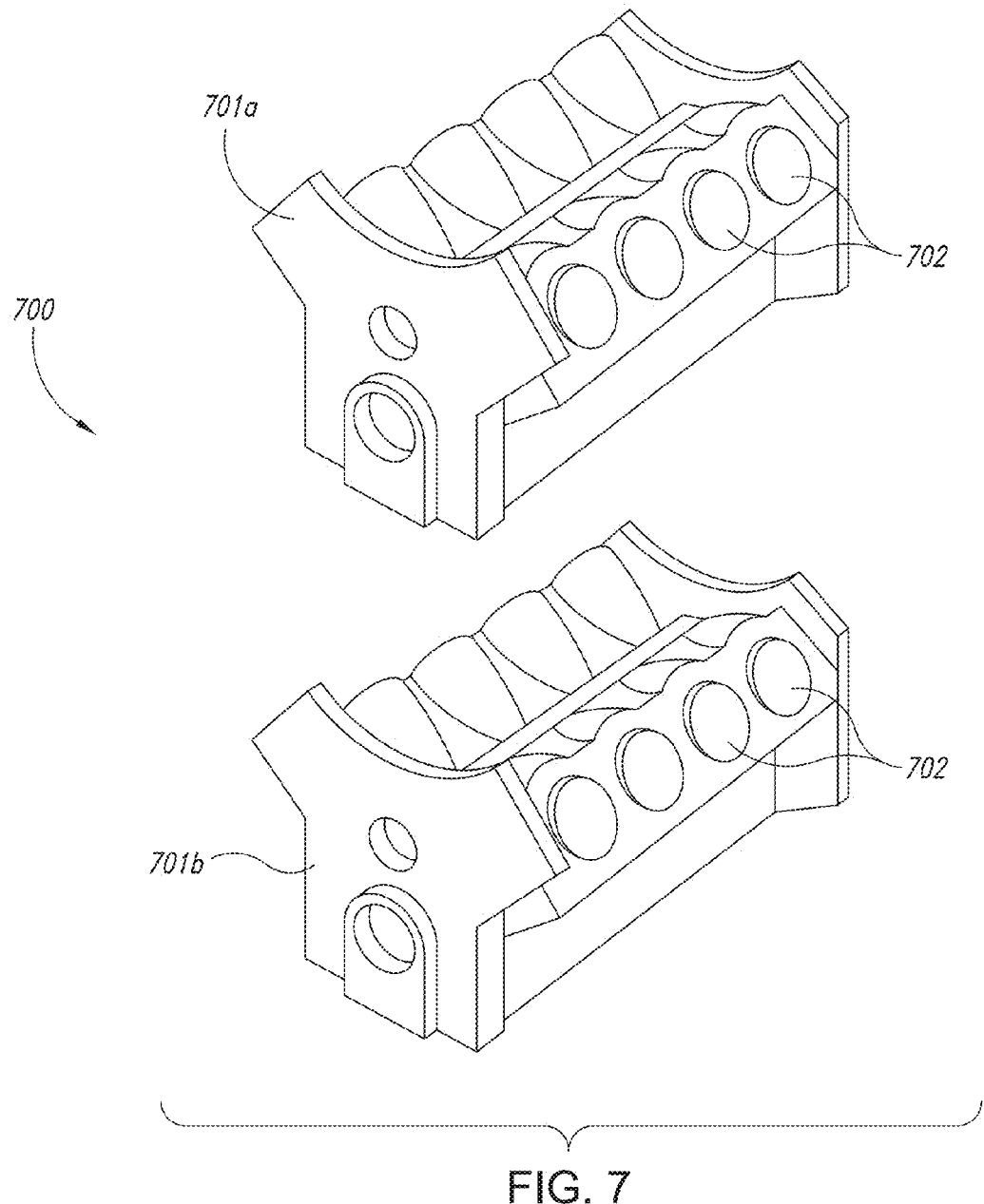
FIG. 7 illustrates two engine blocks configured for compressing and/or expanding a working fluid in accordance with an embodiment of the present technology.

FIG. 7 is a partially schematic illustration of portions of an engine system 700 for use in accordance with particular embodiments of the presently disclosed technology. The engine system 700 can include multiple engine blocks 701 (illustrated as a first engine block 701*a* and a second engine block 701*b*), each of which has multiple cylinders 702 (e.g., eight cylinders per block). The blocks 701 can be existing automotive and/or industrial devices that can be adapted, retrofitted, and/or configured to perform processes generally similar to those described above. For example, one or more of the cylinders 702 can be used to compress gas prior to combustion (or other forms of heat addition), and other cylinders 702 can be used to expand the combusted or otherwise heated air. Different cylinders can have different volumes, either on a per-block basis, or a per-cylinder basis, e.g., by adding a liner, piston cap, and/or other element to reduce cylinder volume. Accordingly, the same block can be used to facilitate multi-stage compression and/or multi-stage expansion.

Figure 8:
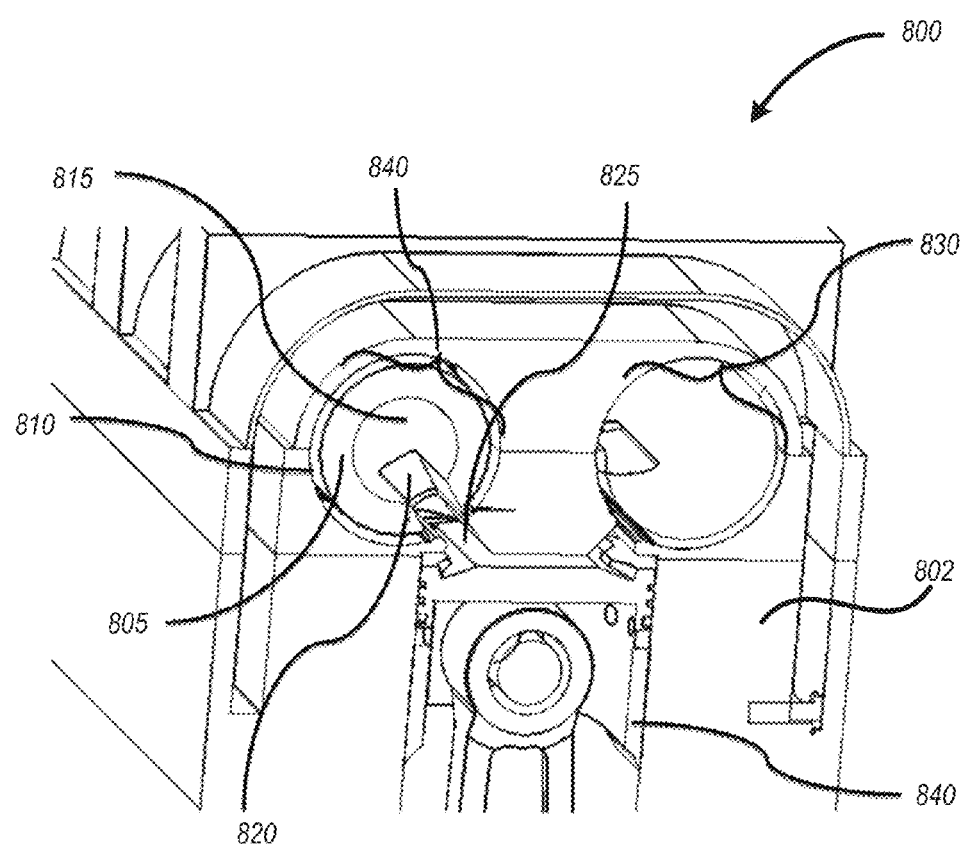
FIG. 8 illustrates a rotary valve used in the presently disclosed technology.

FIG. 8 illustrates details of a particular block of the type described above with reference to FIG. 7. FIG. 8 accordingly illustrates an expander 800 and an expansion cylinder 802 in which a piston 840 reciprocates. The expander 800 can further include a valve housing 810 which carries a high temperature intake valve 740 and an exhaust valve 830. A ceramic liner 805 can be positioned inside the valve housing 810 at the intake valve 840. An internal cavity or passage 815 of the valve can operate as a hot gas manifold which feeds multiple valve ports 820 from a common combustor (not shown in FIG. 8). A hot gas intake port 825 in the cylinder head allows gas to flow into the cylinder when the intake port 825 aligns with the valve port 820 as the overall valve assembly rotates. The exhaust or discharge valve 830 can use similar techniques of port alignment and insulation or cooling techniques and is timed with respect to the motion of the piston 840.

In other embodiments, selected elements of the valve can be cooled, with engine coolant or uncombusted air being suitable coolants. In other embodiments, materials with high temperature capabilities such as refractory metals or ceramics can be employed. In still further embodiments, the foregoing features can be combined. While these challenges are known in the exhaust valving of existing internal combustion engines, the present technology requires the inputs to the cylinders at the much higher temperatures already discussed.

Unlike conventional engine blocks used for internal combustion engines, no combustion takes place in the cylinders shown in FIGS. 7 and 8. Instead, the cylinders are used for compression and/or expansion, with combustion taking place in a separate volume. Further details of a suitable combustor, as well as details of the valves, will be described below with reference to FIGS. 9B and 9C.

FIG. 9A is a partially schematic, partially cut-away illustration of components of a system 900 configured in accordance with an embodiment of the present technology. In a particular aspect of this embodiment, the system 900 can include an engine block generally similar to that described above with reference to FIGS. 7 and 8. In other embodiments, the systems described below can be implemented in other contexts. In any of these embodiments, the system 900 can include an expander 910 having multiple cylinders 902 that receive combustion products or otherwise heated flows, and extract energy from the flows by expanding the flows and producing shaft power. The overall engine system 900 includes a valve system 920 for controlling flow into and out of the cylinders during expansion. Because the valve system 920 receives combustion products at highly elevated temperatures, it can be particularly configured and operated to account for such temperatures, without unduly sacrificing overall efficiency. Details of particular embodiments for carrying out such functions are described further below.

As shown in FIG. 9A, the valve system 920 can include a valve housing or body 921 positioned over a row or other arrangement of cylinders 902 and can include multiple valve elements 922, e.g., an intake valve element 922*a* and an exhaust valve element 922*b*. The intake valve element 922*a* controls the flow of hot combustion products into the cylinder 902, and the exhaust valve element 922*b* controls the flow of expanded and cooled gas out of the cylinder 902. Accordingly, the intake valve element 922*a* can include a valve intake port 923, and the exhaust valve element 922*b* can include a valve exhaust port 924. Both valves 922 can have a generally cylindrical shape to facilitate rotation. As the valves 922 rotate (indicated by arrows R), the ports of the valves align with corresponding ports of the cylinder to facilitate or restrict flow into and out of the cylinders 902. When the parts move to a different rotational position, the valves 922 prevent flow into and out of the cylinders 902.

Each of the valve elements 922 can include insulation 926 to protect the valve element from the high temperatures of the gases passing through the valves. The insulation 926 can be positioned adjacent a central, annular flow passage 925 through which the gases pass on the way into or out of the cylinder 902. In general, the intake valve element 922*a* will experience higher temperatures than the exhaust valve element 922*b* and can accordingly include additional insulation and/or other cooling features, e.g., active cooling features, as is described further below.

In an embodiment shown in FIG. 9A, the insulation 926 of the intake valve element 922*a* is in the form of two liners 927, illustrated as a first liner 927*a* and a second liner 927*b*. The liners 927 can be formed from a ceramic or other suitable high temperature material. The first liner 927*a* is positioned annularly outwardly from the second liner 927*b*, and the second liner 927*b* can form the inner surface of the central flow passage 925. The first liner 927*a* includes first cooling passages 928*a*, and the second liner 927*b* includes second cooling passages 928*b*. A flow of cooling fluid (e.g., a gas, such as air, or a liquid, such as water) passes through the first cooling passages 928*a*, as indicated by arrow A, then returns through the second cooling passages 928*b*, as indicated by arrow B, and is mixed with combustion products passing into the central passage 925, as indicated by arrow C. Accordingly, the cooling flow, once heated, is expanded along with the combustion products to extract additional work from the overall system 900.

The exhaust valve element 922*b* can have an arrangement simpler than that of the intake valve element 922*a*, e.g., a single layer of insulation 926, with no cooling passages. In other embodiments, the exhaust valve element 922*b* can include active cooling passages and/or other cooling arrangements depending upon the temperature of the gas passing through it.

Figure 9B:
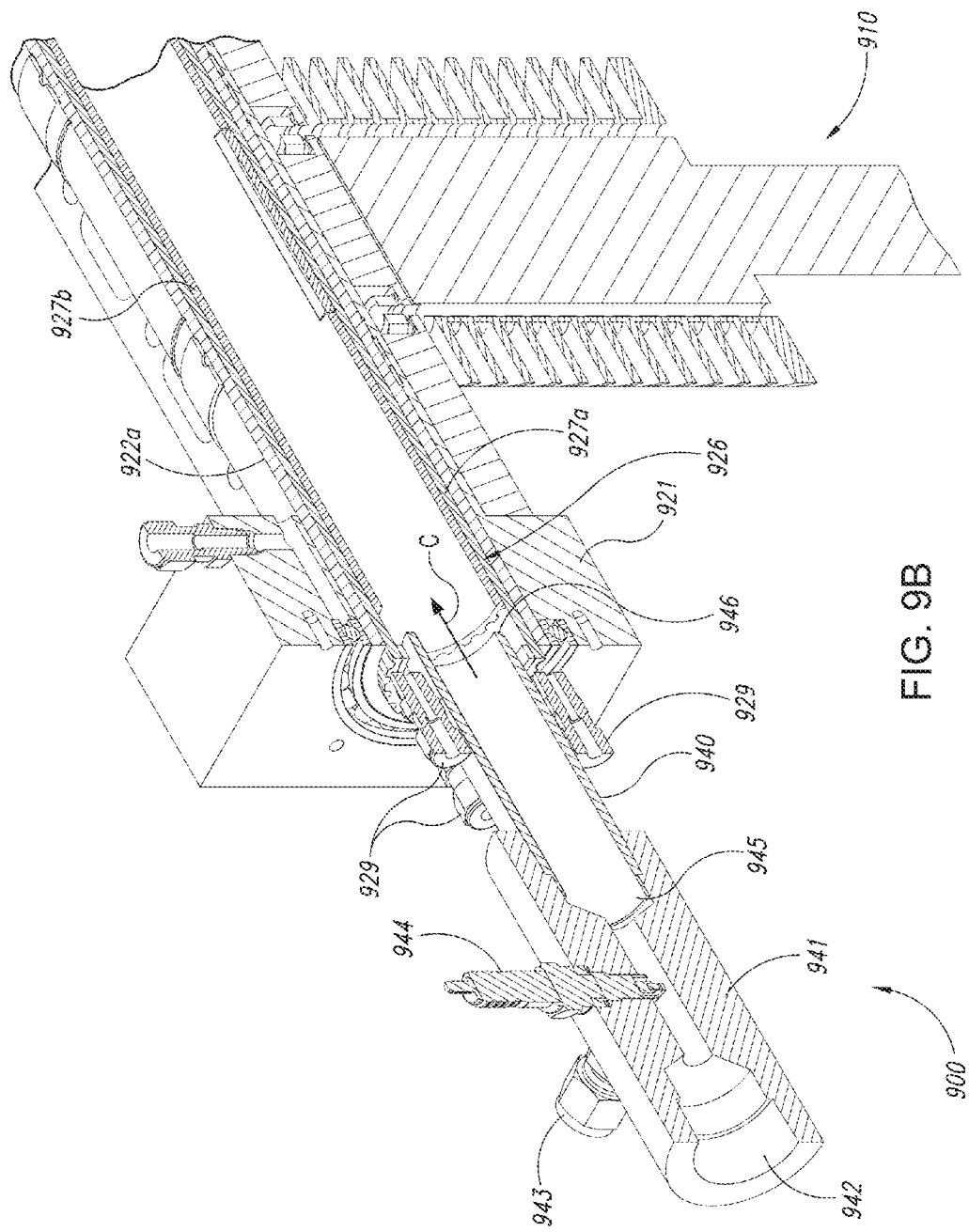
FIG. 9B is a partially cut-away illustration of a system that includes a combustor coupled to an expander having a rotary valve in accordance with an embodiment of the present technology.

FIG. 9B is a partially schematic, cut-away illustration of an embodiment of the intake valve element 922*a*, generally similar to that described above with reference to FIG. 9A, positioned in fluid communication with a combustor 940. The combustor 940 includes a combustor inlet 945 and a combustor outlet 946. The combustor inlet 945 is coupled to a combustor intake manifold 941 that provides reactants to the combustor 940. The combustor intake manifold 941 can include a compressed air inlet 942, a fuel inlet 943, and an ignition source 944, e.g., a spark source, flame holder, and/or other suitable device for initiating, controlling and/or maintaining the combustion reaction within the combustor 940, and/or optimizing or enhancing the composition of the combustion products, e.g., by controlling production of species such as $NO_x$ or CO. The combustion products are then directed from the combustion outlet 946 into the intake valve element 922a, as indicated by arrow C.

The valve housing 921 in which the intake valve element 922a is positioned can include one or more cooling flow introducers 929 (three are visible in FIG. 9B) that direct compressed air or another coolant into the first flow passages of the first liner 927a. The cooling flow introducer(s) 929 can be coupled to the same source of compressed air as is the compressed air inlet 942, or can be connected to another source of compressed air. In either embodiment, the compressed air provided by the cooling flow introducer 929 is significantly cooler than the combustion flow products directed into the central flow passage 925.

Figure 9C:
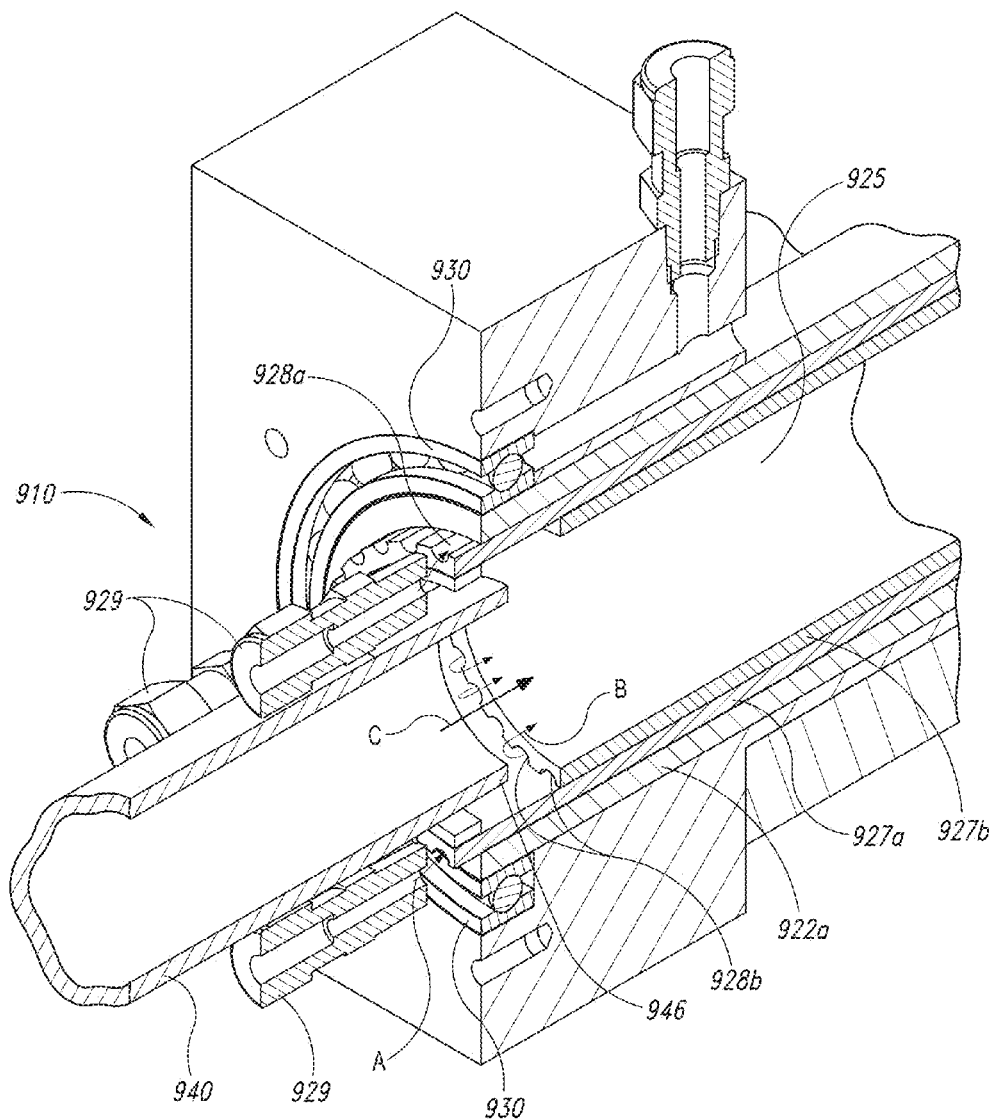
FIG. 9C is an enlarged illustration of an embodiment of the combustor and expander shown in FIG. 9B.

FIG. 9C is an enlarged illustration of a portion of the system 900 described above with reference to FIG. 9B. As shown in FIG. 9C, a bearing 930 supports the intake valve element 922a for rotation about the major axis of the annular flow passage 925. The cooling flow introducers 929 are radially aligned with the first cooling passages 928a. In an embodiment shown in FIG. 9C, the cooling flow introducers 929 intermittently align with corresponding first cooling passages 928 as the first valve element 922a rotates. In other embodiments, a single cooling flow introducer 929 (e.g., a 360° manifold) can provide the cooling flow on a continuous basis. In either of the foregoing embodiments, the cooling flow enters the first cooling passages 928a as indicated by arrow A and returns to the region proximate to the combustor exit 946 via the second cooling passages 928b. Further details of an arrangement by which the cooling flow is redirected from the first cooling passages 928a to the second cooling passages 928b are described further below with reference to FIG. 9D.

FIG. 9D illustrates a portion of the expander 910 positioned distal from the combustor exit 946 shown in FIG. 9C. In this region, the first valve element 922a includes a valve end wall 932 that forms a boundary of the central flow passage 925. An annular return passage 931 can be positioned adjacent the end wall 932. Cooling flow passes out of exposed ends of the first cooling passages 928a into the return passage 931 and then into the second cooling passages 928b. The cooling flow then mixes with the combustion products flow C proximate to the combustor exit, as described above with reference to FIG. 9C.

Particular embodiments of the expander were described above in the context of FIGS. 9A-9D as including a rotary valve system. In other embodiments, the expander can include valve systems having other configurations. For example, the valve system can include poppet valves. FIGS. 10A-10D illustrate representative, cooled, poppet valve arrangements configured in accordance with particular embodiments of the present technology.

Figure 10A:
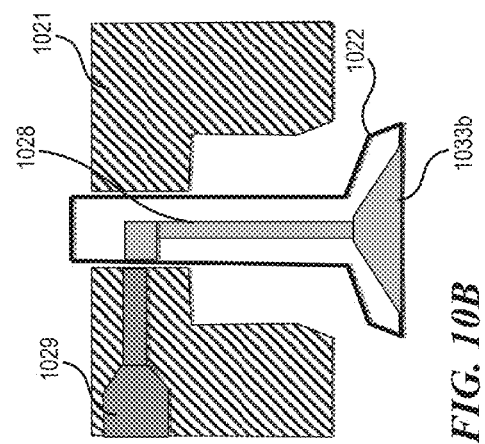
FIG. 10A is a partially schematic, cross-sectional illustration of an internally cooled poppet valve configured in accordance with an embodiment of the present technology.

Referring first to FIG. 10A, a poppet valve system 1020 includes a valve housing 1021 carrying a poppet valve 1022. The poppet valve 1022 reciprocates up and down to allow or prevent a flow of combustion products C into the cylinder below, e.g., in a manner generally similar to that of conventional automotive engines. The poppet valve 1022 can include an internal cooling passage 1028 that receives cooling flow from an introducer 1029 carried by the valve housing 1021. The internal cooling passage 1028 can have a relatively small passage exit 1033a in a particular embodiment shown in FIG. 10A.

Figure 10B:
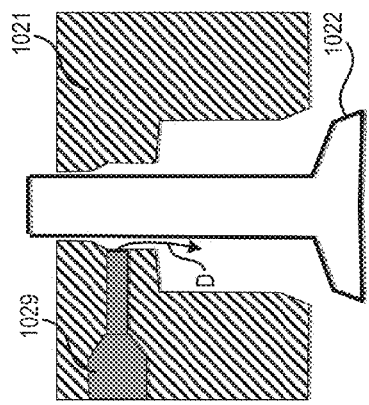
FIG. 10B is a partially schematic, cross-sectional illustration of an internally cooled poppet valve, having a flared cooling passage exit in accordance with an embodiment of the present technology.
Figure 10C:
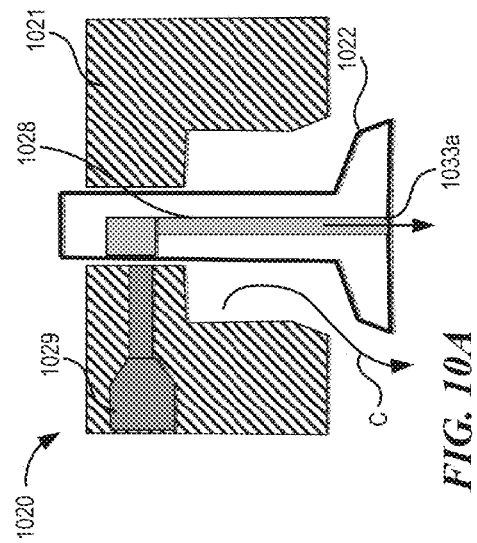
FIG. 10C is a partially schematic, cross-sectional illustration of a poppet valve having an internal cooling passage with multiple passage exits in accordance with an embodiment of the present technology.

In an embodiment shown in FIG. 10B, the internal cooling passage 1028 can include a flared passage exit 1033b that can provide for additional cooling at the end of the poppet valve 1022. In another arrangement shown in FIG. 10C, the poppet valve 1022 includes multiple flow passages 1028 having multiple passage exits 1033c.

Figure 10D:
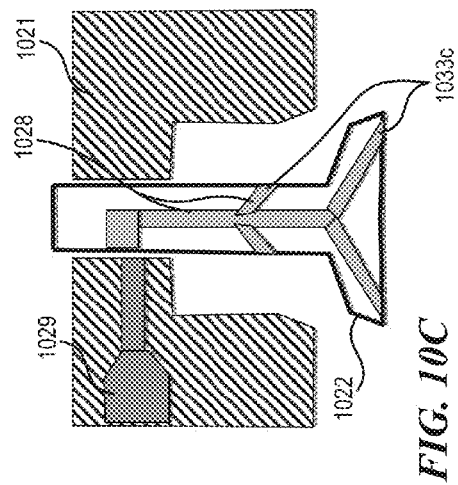
FIG. 10D is a partially schematic, cross-sectional illustration of a poppet valve cooled via an external cooling film in accordance with another embodiment of the presently disclosed technology.

In still another embodiment shown in FIG. 10D, the poppet valve 1022 does not include an internal cooling passage. Instead, the introducer 1029 directs an external cooling film D around the external surface of the poppet valve 1022. In other embodiments, the external cooling film D can supplement internal cooling passages having any of the configurations described above with reference to FIGS. 10A-10C.

Figure 11A:
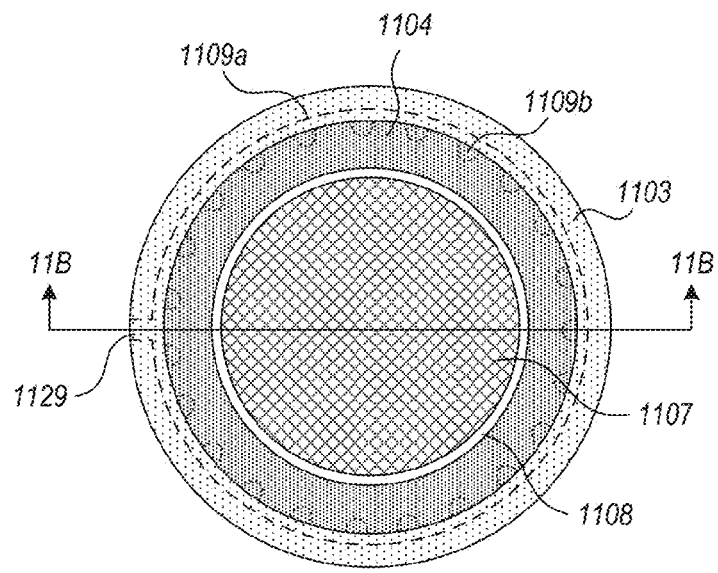
FIG. 11A is a partially schematic top view of a piston and cylinder having actively cooled surfaces in accordance with an embodiment of the present technology.
Figure 11B:
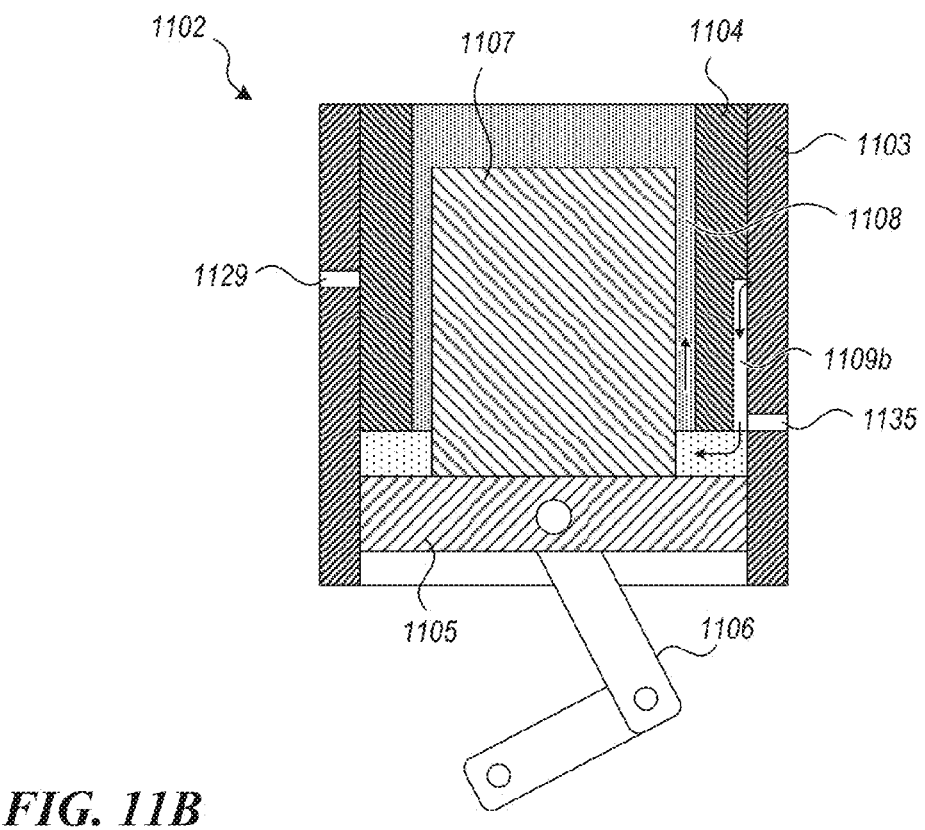
FIG. 11B is a partially schematic, side cross-sectional illustration of an embodiment of the piston and cylinder shown in FIG. 11A.

In at least some embodiments, other elements of the overall engine system can be cooled to increase the overall efficiency of the system and/or to keep local temperatures within material limitations. For example, FIG. 11A is a top down view of an expansion cylinder 1102 and an associated piston. FIG. 11B is a partially schematic, cross-sectional illustration of the cylinder and piston shown in FIG. 11A, taken substantially along line 11B-11B of FIG. 11A. Referring first to FIG. 11A, the cylinder 1102 includes a cylinder wall 1103 and an insulating liner 1104 disposed radially inwardly from the wall 1103. The piston (not visible in FIG. 11A) includes a piston cap 1107 that is positioned radially inwardly from the liner 1104. The piston cap 1107 is separated from the liner 1104 by a gap 1108. The piston cap 1107 can be formed from an insulating material to protect the piston underneath from high temperatures within the cylinder 1102 and/or to reduce the temperature loss of the expanding fluid. Suitable materials for the piston cap 1107 and other insulating elements of the overall system include ceramics, e.g., alumina, zirconia, and/or alloys of these materials.

To further protect the piston and the cylinder 1102, the cylinder wall 1103 can include a flow injector passage 1129. The flow injector passage 1129 directs a cooling flow to a circumferential distribution channel 1109a, which in turn directs the cooling flow to one or more axial distribution channels 1109b extending inwardly from the plane of FIG. 11A. In one embodiment, the circumferential distribution channel 1109a is formed in the cylinder wall 1103, and the axial distribution channels 1109b are formed in the liner 1104. In other embodiments, the relative positions of these circumferential and axial distribution channels 1109a, 1109b can be reversed, or both types of channels can be carried by either the liner 1104 or the cylinder wall 1103.

Referring now to FIG. 11B, the piston cap 1107 is positioned over a piston 1105, which is in turn coupled to a crank 1106. In operation, a cooling flow is directed into the flow injector passage 1129, passes circumferentially around the cylinder 1102 via the circumferential distribution channel 1109a (FIG. 11A) and passes downwardly at the interface between the liner 1104 and the cylinder wall 1103 via the axial distribution channels 1109b (one of which is visible in FIG. 11B). The cooling flow can then pass upwardly in the gap 1108 between the piston cap 1107 and the liner 1104.

In one embodiment, the cooling flow can be directed into the cylinder 1102 during only the downward stroke of the piston 1105. This action can be controlled by a valve coupled to the flow injector passage 1129, or by the piston 1105. For example, as the piston 1105 rises in the cylinder 1102, the additional pressure it creates can prevent additional cooling flow from entering via the flow injector passage 1129. In either embodiment, the cylinder 1102 can also include a discharge port 1135 that allows at least a portion of the cooling flow to exit the cylinder 1102 without becoming mixed with the exhaust flow above the piston cap 1107. This discharged cooling flow can then be directed to the recuperator, the combustor, and/or other elements of the system, depending upon the temperature and pressure of the discharged cooling flow. The discharged cooling flow can transfer heat via direct mixing, or via heat transfer through a wall or other surface.

Figure 11C:
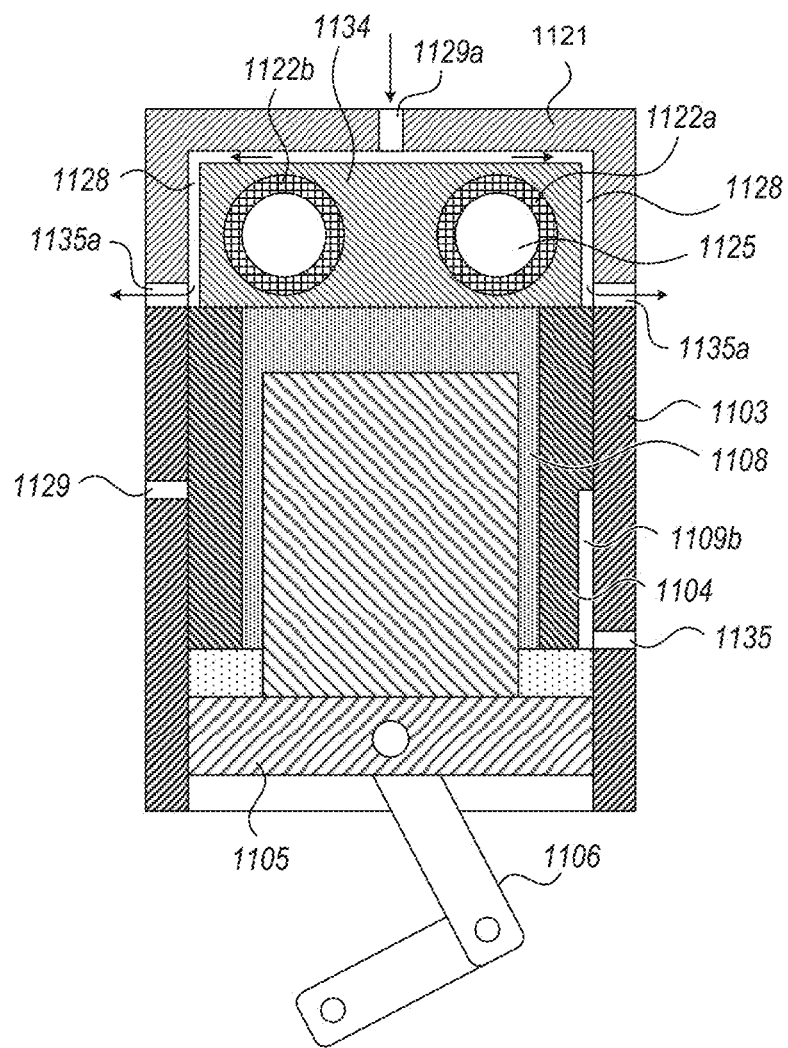
FIG. 11C is a partially schematic, side cross-sectional illustration of an embodiment of the piston and cylinder shown in FIG. 11A, with a cooled head or valve housing installed.

FIG. 11C is a partially schematic cross-sectional illustration of the cylinder 1102 described above with reference to FIGS. 11A and 11B, with a valve housing 1121 positioned above the cylinder 1102. The valve housing 1121 can include intake and exhaust valve elements 1122a, 1122b, each having a central passage 1125. The valve ports and corresponding cylinder ports are not visible in FIG. 11O. The valve elements 1122a, 1122b can be at least partially surrounded by a block or other volume of insulation 1134. The valve housing 1121 can include a valve flow injector passage 1129a that directs cooling flow into one or more corresponding cooling passages 1128. The cooling passages 1128 cool the interface between the insulation 1134 and the valve housing 1121. The cooling flow exits the valve housing 1121 via one or more cooling flow exit ports 1135a. The discharged cooling flow can be re-used by other system elements (e.g., the recuperator or the combustor) as discussed above, depending upon the pressure and temperature of the discharged cooling fluid. In a particular embodiment, the cooling flow exiting from the valve housing 1121 can be redirected to provide cylinder cooling in the manner described above with reference to FIGS. 11A-11B.

The regenerative cooling embodiments described above can capture the heat from the hot gas components and return the heat to the system, e.g., return the heat to the working fluid. When regenerative cooling is performed effectively, insulating the outside of the device (e.g., the expander) can further reduce the heat loss of the system. Generally, such insulation is only beneficial when either regenerative cooling is sufficient to keep the insulated part of system at otherwise acceptable temperatures, or the cooling mechanism is used for an internal or external productive process (e.g. cogeneration/space heating). If the harvested heat has a useful purpose, then external insulation is often beneficial. If not, the passive convective cooling is often an inexpensive way to help maintain acceptable system temperatures. A similar analysis can apply to the compressor. If the collected heat is going to be used, then the compressor can be insulated which allows more heat collection. However, in a compressor, the heat loss through the machine actually makes the compression process more efficient because cooler gas is denser and therefore requires less work to compress. Accordingly, compressors can be designed to extract heat from the working fluid, which is the opposite of expanders where lost heat results in a reduction in power output. If the heat can be collected and has a useful function, insulation is beneficial. If not, then it is typically desirable to run compressors as cool as possible and expanders as hot as possible.

Figure 12A:
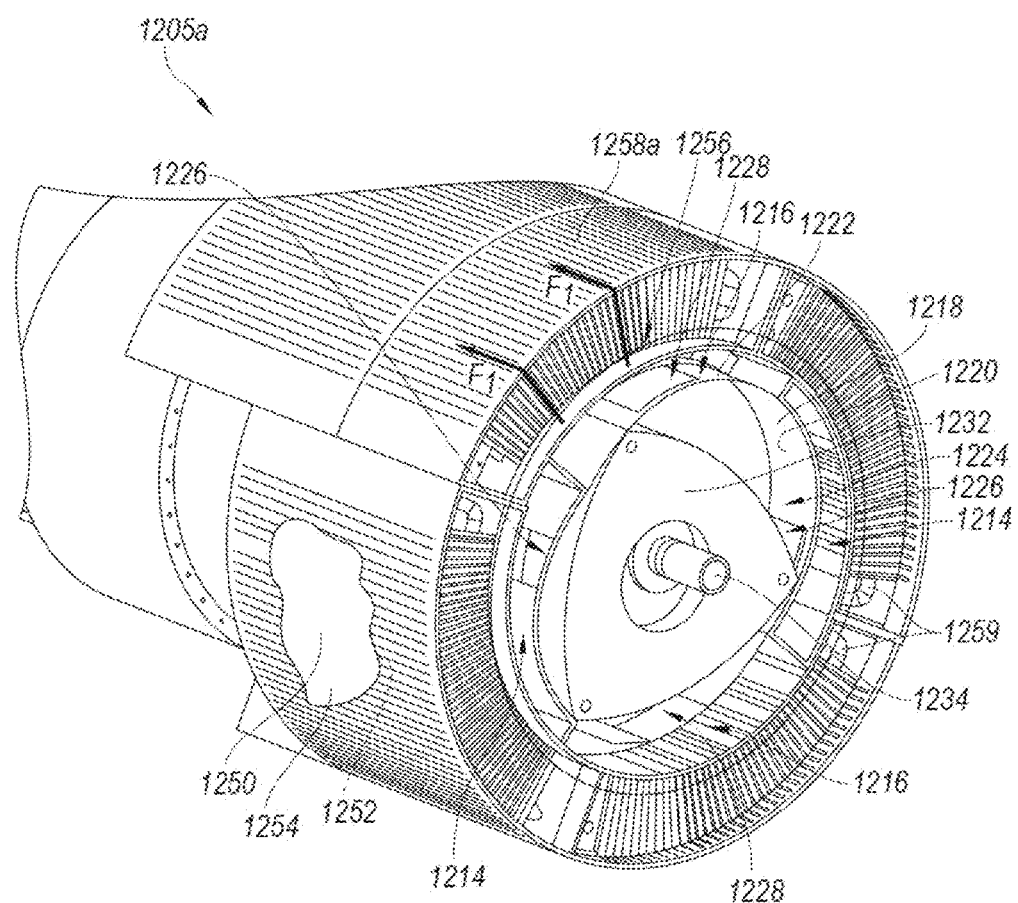
FIG. 12A is a partially schematic, partially cut-away isometric illustration of a rotary device configured to operate as a compressor and/or an expander in accordance with an embodiment of the present technology.

Several embodiments of the systems described above were described in the context of reciprocating positive displacement machines. In other embodiments, the overall system can include rotary positive displacement machines. For example, FIG. 12A is a partially schematic isometric view of a rotary displacement device 1205a having an integral heat exchanger 1258a configured in accordance with an embodiment of the disclosure. The system 1205a is a positive displacement machine and can be operated as an expander by rotating in one direction, and a compressor by rotating in the opposite direction. Accordingly, two such devices can be used in conjunction with a combustor to form any of the systems described above. One such device can operate as the fluid storage compressor 420, described above with reference to FIG. 4. Further details of a suitable rotary compressor/expander are described in co-pending U.S. application Ser. No. 13/038,345, previously incorporated herein by reference.

The device 1205a can include a chamber housing 1218 (e.g., a compression and/or expansion chamber) having an inner wall 1220 and an outer wall 1222, a pressure-modifying chamber 1224, a rotor 1232 rotatably coupled to a shaft 1234, first and second passageways 1214, 1216, and first and second ports 1226, 1228 in the chamber 1224 providing fluid communication between the chamber 1224 and the individual passageways 1214, 1216. The heat exchanger 1258a is positioned radially outside the chamber housing 1218 and the passageways 1214, 1216. The heat exchanger 1258a can operate as an intercooler when the rotary displacement device 1205a operates as a compressor. The heat exchanger 1258a includes one or more heat exchanger supply tubes 1259 which convey a heated or cooled heat exchanger fluid. In the illustrated embodiment, the heat exchanger 1258a surrounds a portion of the chamber housing 1218 and is in fluid communication with working fluid from the pressure-modifying chamber 1224. Specifically, working fluid exiting the chamber 1224 via the second port 1228 flows radially outwardly in the direction of arrows F1 through the second passageway 1216, and into a heat exchanger passageway 1256 to make contact with the heat exchanger 1258a. The working fluid exchanges heat with the heated or cooled heat exchanger fluid in the supply tube 1259.

The system further comprises an outer housing 1250 (a portion of which is shown in FIG. 12A) having an inner surface 1252 and an outer surface 1254. The outer housing 1250 can at least partially surround and/or encase the chamber housing 1218, the pressure-modifying chamber 1224, the passageways 1214, 1216, and the heat exchanger 1258a. In several embodiments, pressurized working fluid passing through the heat exchanger 1258a contacts the inner surface 1252 of the outer housing 1250, which acts as a pressure vessel to contain the working fluid. Using the interior of the outer housing 1250 as a pressure vessel eliminates the need for several pipe-fittings and passageways between the pressure-modifying chamber 1224 and the ports 1226, 1228, the passageways 1214, 1216, and the heat exchanger 1258a, and between one stage and the next in multi-stage systems.

The heat exchanger 1258a illustrated in FIG. 12A is a finned-tube heat exchanger. Other embodiments can include other types of heat exchangers such as shell-and-tube heat exchangers, plate heat exchangers, gas-to-gas heat exchangers, direct contact heat exchangers, fluid heat exchangers, phase-change heat exchangers, waste heat recovery units, or other types of heat exchangers.

The heat exchanger fluid can comprise freshwater, seawater, steam, coolant, oil, or other suitable gaseous liquid and/or biphasic fluids. The heat exchanger 1258a can operate in both the compression and expansion modes to support a bidirectional compressor/expander, and may interact with the compressed/expanded flow before or after the flow enters the chamber 1224. In some embodiments, the heat exchanger fluid is the same for both the compression and expansion modes of operation of the device (when the device is used for both compression and expansion), while in other embodiments, different heat exchanger fluids are used. In some embodiments, heat exchanger fluid that is heated during operation in the compression mode can be stored, e.g., in an exterior thermal storage reservoir for use during operation in the expansion stage. The heat exchanger 1258a can be made of a number of suitable materials or combinations of materials, including metals, ceramics, or plastics. In several embodiments, the heat exchanger is at least partially made of corrosion-resistant materials (e.g. copper, cupro-nickel, titanium, stainless steel and others) in order to allow for the use of a wide variety of heat exchange fluids.

As will be discussed in further detail below with reference to FIG. 12B, multiple pressure-modifying chambers 1224 (e.g., stages) can be fluidly connected and can operate in series. In some multi-stage embodiments, the radial heat exchanger 1258a axially extends along the outer wall 1222 of multiple chamber housings 1218. In such an embodiment, the compressed/expanded working fluid travels radially outwardly from a first port 1228 of a first stage (as indicated by arrows F1), into the heat exchanger 1258a, axially along the heat exchanger 1258a, and then radially inwardly to enter a second port of a second pressure-modifying chamber (not shown). When the system operates in the compression mode, the working fluid can be cooled between stages. When the system operates in the expansion mode, the working fluid can be heated between stages. Interstage heating and cooling can reduce (e.g., minimize) the temperature changes between stages that can rob the device 1205a and the overall system of operating efficiency. By directing the working fluid in the passageways 1214, 1216 radially outwardly from the chamber housing 1218 the system can reduce pressure oscillations between stages and allow for significant heat exchanger length.

Figure 12B:
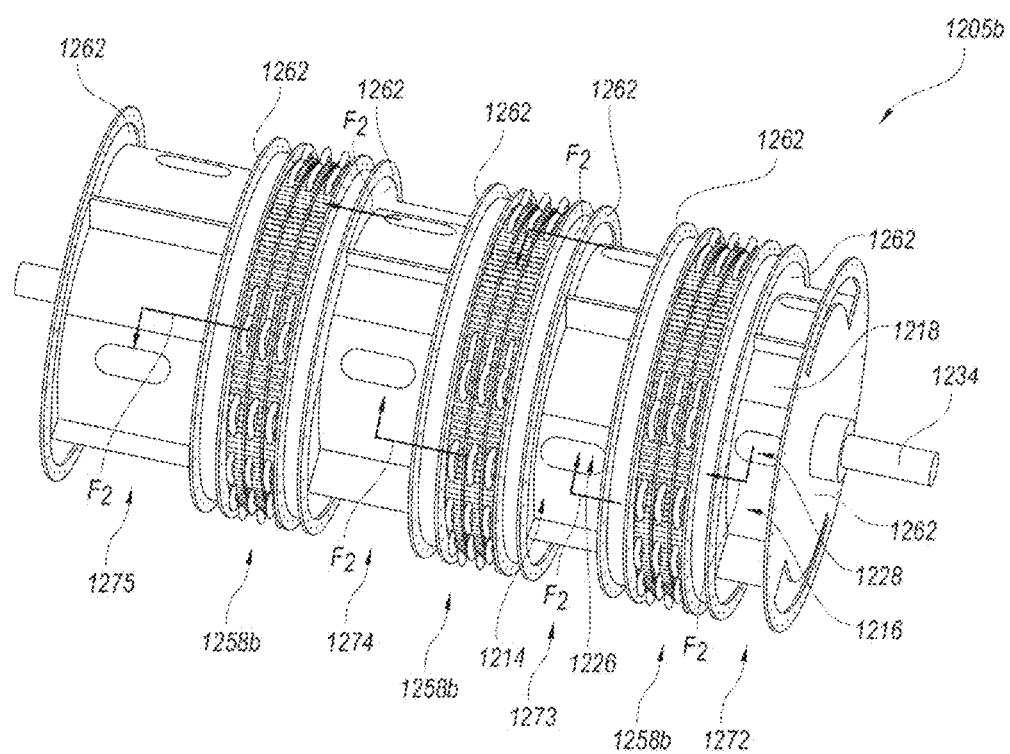
FIG. 12B is a partially schematic, isometric illustration of an embodiment of the compressor/expander shown in FIG. 12A, further illustrating an interstage cooling arrangement.

FIG. 12B is a partially schematic, isometric side view of a multi-stage rotary displacement device 1205b having multiple integral heat exchangers 1258b in accordance with another embodiment of the disclosure. The device 1205b includes multiple stages (numbered individually as stages 1272-1275) axially aligned along a shaft 1234. For purposes of clarity, the rotors carried by the shaft 1234 are not shown in FIG. 12B. Each stage can include a chamber housing 1218 having first and second ports 1226, 1228, a first passageway 1214, and a second passageway 1216. Each stage 1272-1275 can additionally include one or more bulkheads 1262 positioned axially adjacent to the corresponding chamber housing 1218.

The device 1205b further includes multiple axial heat exchangers 1258b axially aligned between compression/expansion stages 1272-1275. The heat exchangers 1258b are in fluid communication with working fluid in the first and/or second passageways 1214, 1216. Specifically, the working fluid travels from one stage to the next in the direction of arrows F2 for expansion, or in the opposite direction for compression. For example, the working fluid can exit a first stage 1272 through a corresponding second port 1228 and then flow axially into an axially adjacent heat exchanger 1258b. The working fluid then enters the first port 1226 of the adjacent stage 1273 and the process is repeated as the working fluid travels from right to left in FIG. 12B. In some embodiments, the working fluid travels directly from the second passageway 1216 into the heat exchanger 1258b and in other embodiments the working fluid traverses through one or more apertures in the adjacent bulkhead 1262 and then into the adjacent heat exchanger 1258b. The working fluid transfers thermal energy in the heat exchanger 1258b and continues axially into the first passageway 1214 and first port 1226 of the adjacent second stage 1273. The first port 1226 and second port 1228 of sequential stages may be offset clockwise or counterclockwise relative to each other in order to better direct the working fluid through the device 1205b.

Like the radial heat exchanger 1258a discussed above with reference to FIG. 12A, the axial heat exchanger 1258b can operate in both compression and expansion modes to support a bidirectional compressor/expander. Any of the types of heat exchangers and heat exchanger fluids described above can be used in the axial heat exchanger 1258b as well. While three heat exchangers 1258b and four compression/expansion stages 1272-1275 are illustrated in FIG. 12B, other embodiments can include more or fewer stages and/or heat exchangers 1258b, and the arrangement of the stages 1272-1275 and heat exchangers 1258b can vary. For example, a multi-staged design can be used in systems not having an integral heat exchanger. Furthermore, the axial length of the compression/expansion stages 1272-1275 and the heat exchangers can vary within a system 1205b. For example, differing axial lengths can be used to maintain generally consistent pressure ratios from one stage to the next due to the changing density of the working fluid from stage to stage.

One feature of several embodiments of the energy systems described above is that they can be made relatively compact and portable, for use in transportation contexts, and/or so as to be moved from one site to the other. In a particular embodiment described below with reference to FIGS. 13A-13D, the engine system can be housed in a container. For example, beginning with FIG. 13A, an engine system 1300 configured in accordance with an embodiment of the present technology is housed in a container 1350. The container 1350 can have a standard size and configuration so as to be suitable with existing container handling devices.

Figure 13A:
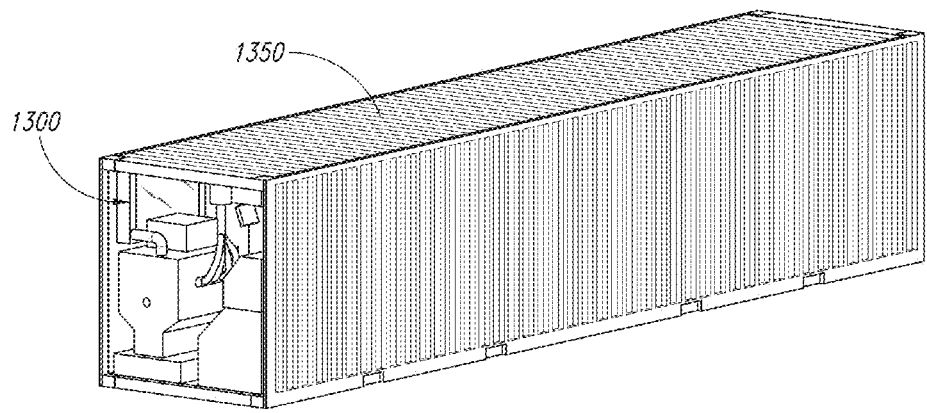
FIG. 13A is a partially schematic isometric illustration of an engine system configured to fit within a standard size container in accordance with an embodiment of the present technology.
Figure 13B:
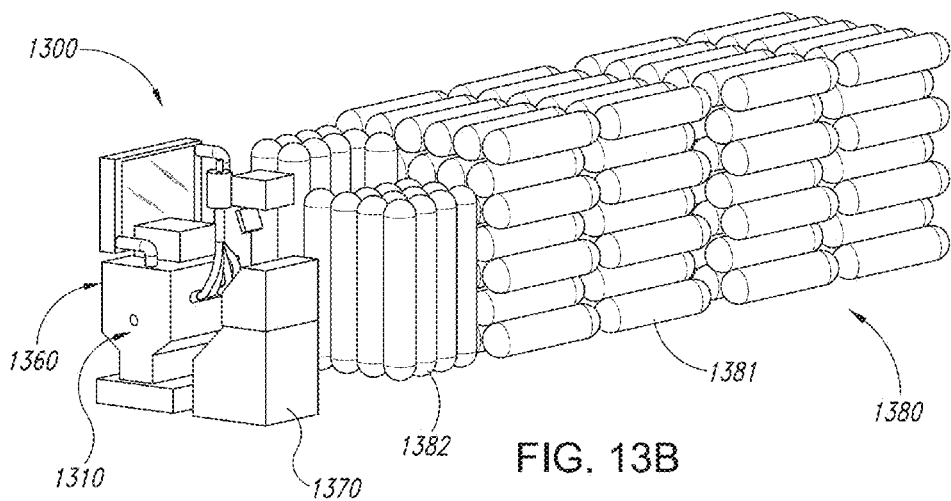
FIG. 13B is a partially schematic illustration of the engine system shown in FIG. 13A.

FIG. 13B is a partially schematic illustration of the engine system 1300 shown in FIG. 13A. The engine system 1300 can include any of the components described above with reference to FIGS. 1-12, several of which are visible in FIG. 13B. These include a compressor 1360, an expander 1310, and a controller 1370. Fuel and air is provided to a combustor (not visible in FIG. 13B) via fuel tanks 1382 and air tanks 1381, respectively. In other embodiments, other storage volumes 1380 can be used to house fuel and air.

Figure 13C:
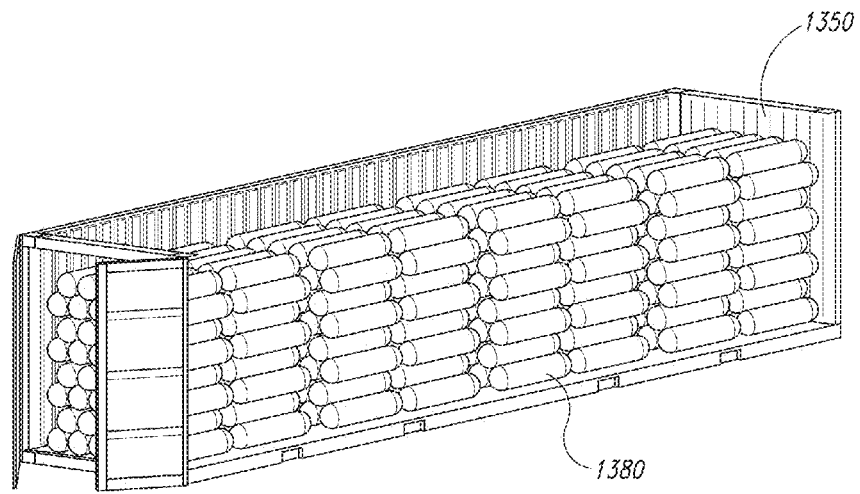
FIG. 13C is partially cut-away illustration of a series of tanks stored in a container in accordance with a particular embodiment of the presently disclosed technology.

FIG. 13C illustrates a container 1350 that includes only storage volumes 1380, for example, multiple stacked tanks for fuel and/or air. Accordingly, the engine system 1300 can include containers dedicated to fuel and/or air storage, containers dedicated to the engine system components (e.g., compressors, expanders and/or combustors), and/or containers that have both engine system components and storage capabilities.

Figure 13D:
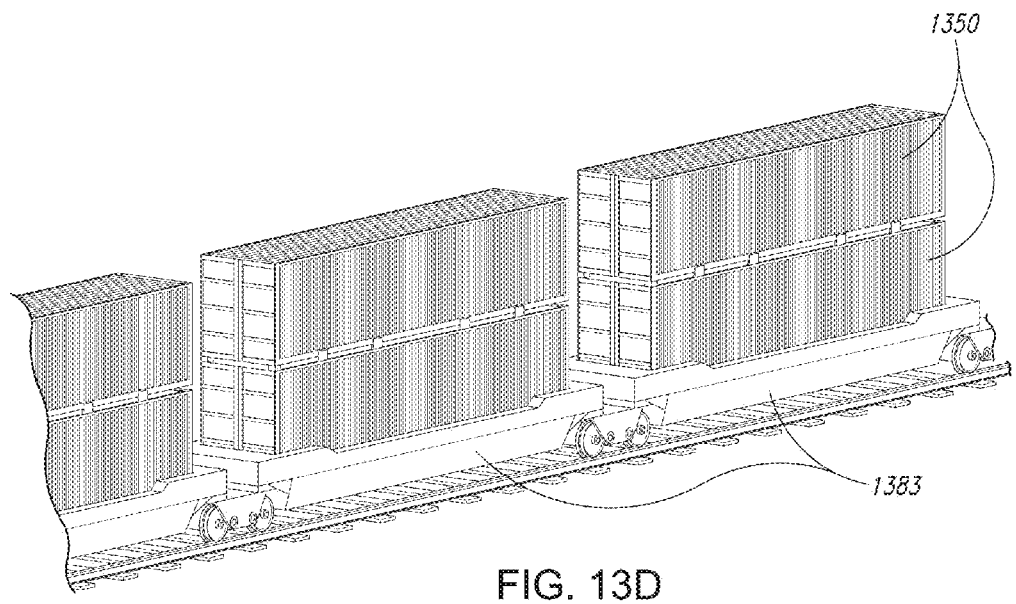
FIG. 13D illustrates multiple containers for storing an engine system and/or multi-tank arrangement in accordance with an embodiment of the present technology.

FIG. 13D illustrates a railcar having multiple stacked containers 1350 containing one or more engine systems 1300 of the type described above. In one embodiment, the railcar 1383 can simply transport the containers 1350 from one site to another. In another embodiment, the railcars 1383 can be coupled directly behind a locomotive, and can provide power to the locomotive, in lieu of or in addition to power provided by conventional diesel or diesel electric locomotive engines.

Figure 14A:
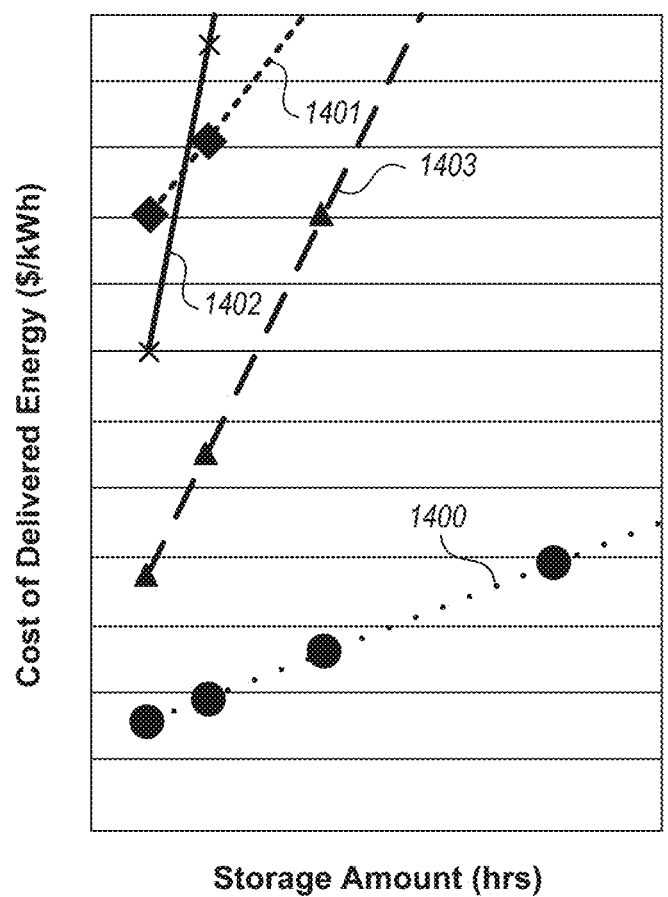
FIGS. 14A-14C illustrate comparisons of expected engine system performance for conventional engines and engine systems in accordance with the presently disclosed technology.
Figure 14B:
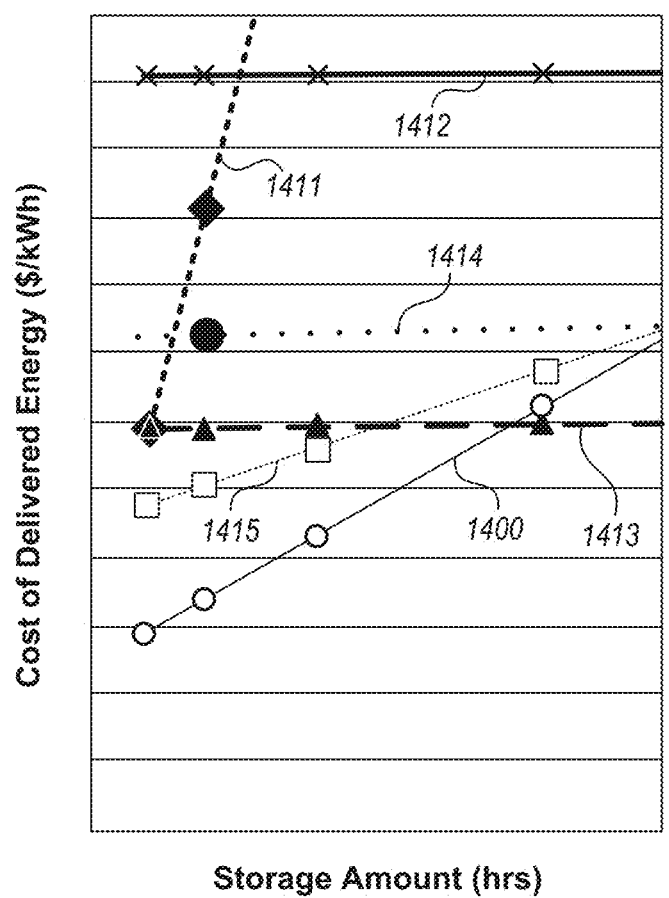
Figure 14C:
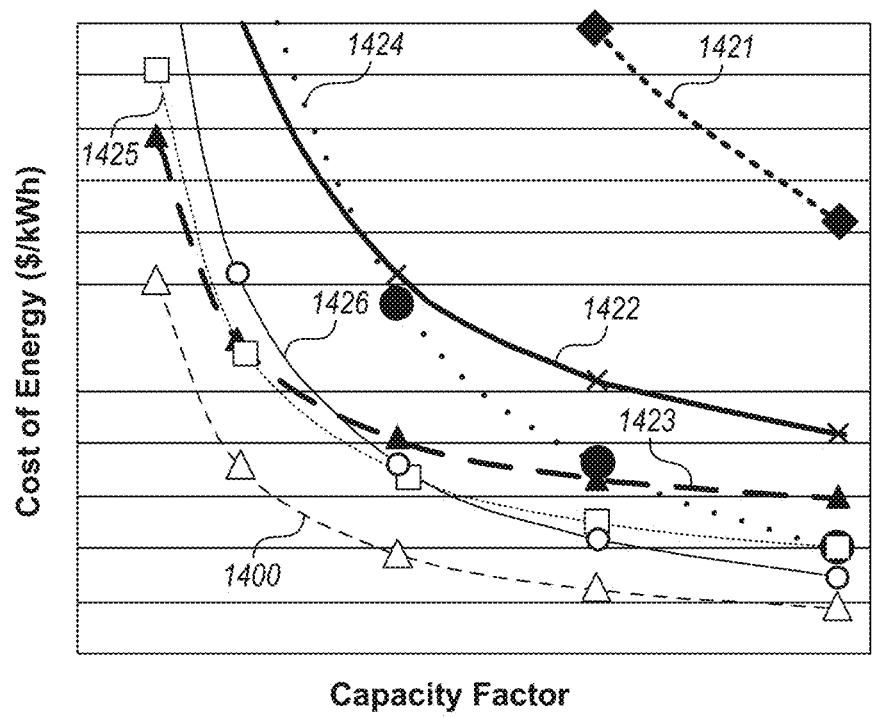

FIGS. 14A-14C are graphs comparing expected performance parameters for engine systems of the type described above, with those of conventional energy systems. FIG. 14A compares the cost of delivered energy as a function of energy storage amount for a system configured in accordance with an embodiment of the present technology (indicated by line 1400) and other systems. In particular, line 1400 corresponds to an engine system having a positive displacement, intercooled compressor, a combustor, a positive displacement expander different than the compressor, and a recuperator positioned to transfer heat from the expander exhaust to the compressor outflow. The other systems include battery systems, in particular, a sodium sulfur battery (indicated by line 1401) a lithium ion battery (indicated by line 1402) and a flow battery (indicated by line 1403). As these projections indicate, the expected performance parameters of energy systems of the type disclosed above can be significantly better than those of existing battery systems.

FIG. 14B compares expected performance parameters of the presently disclosed engine systems to existing non-battery systems. In particular, line 1400 again indicates the expected cost of delivered energy as a function of storage amount for an engine system of the type described above, compared with an hydraulic fluid/air system (line 1411) pumped (e.g., recirculated) hydroelectric power (line 1412), conventional geologic compressed air energy storage (line 1413), an annular positive displacement machine with air compression and expansion, but no combustion (line 1414), and a refrigerant-based, closed loop energy conversion system (line 1415).

FIG. 14C is a graph illustrating the cost of energy as a function of a capacity factor (e.g., the fraction of a year) for the present technology as compared with other technologies that provide power to the electric power grid. Line 1400 again illustrates the projected performance for systems in accordance with the present technology, while line 1421 illustrates the grid power provided by a solid oxide fuel cell. Other wholesale grid power suppliers include a gas turbine (line 1422), a natural gas internal combustion genset (line 1423), scrubbed coal combustion (line 1424), an advanced turbine (line 1425), and an advanced combined cycle engine (line 1426). As shown in FIG. 14C, embodiments of the present technology that include a compressor (with interstage cooling) a combustor, an expander (e.g., with high-temperature capable valves) and a heat exchanger, can consistently out-perform existing energy delivery systems.

From the foregoing, it will be appreciated that specific embodiments of the present technology have been described herein for purposes of illustration, but that various modifications may be made without deviating from the technology. For example, the foregoing description identified specific embodiments of compressors, expanders, combustors and associated valving and other systems. In other embodiments, other devices, systems, and/or subsystems that perform generally the same functions described above can be used in addition to or in lieu of the disclosed systems. Several embodiments were described above in the context of a recuperator for capturing exhaust energy from the expander. In other embodiments, the system can include other types of exhaust energy recovery devices. Several embodiments of the system were described in the context of a combustion heater. In other embodiments, the heater can have other suitable configurations.

Embodiments of the foregoing systems can be incorporated into any of a variety of suitable larger systems. For example, the foregoing systems can be used to provide power for transportation and/or stationary applications. When used for stationary applications, the systems can provide stand-alone power, or can be coupled to an electrical grid, e.g., a regional, national or international grid.

Certain aspects of the technology described in the context of particular embodiments may be combined or eliminated in other embodiments. For example, some systems can include an intercooled compressor without a high temperature valve. Other systems can include a high temperature valve without an intercooled compressor. The overall systems can include any suitable combination of the elements described herein. For example, the compressor can be a reciprocating device and the expander can be a rotary device, or vice versa. When a storage compressor is implemented, the storage compressor can be a rotary compressor, while the primary compressor is a reciprocating compressor, or vice versa. The high temperature rotary valve system can be used for the expander, and a poppet valve system can be used for the compressor. In some cases, compressor temperatures may be high enough to justify the use of an actively cooled valve. In such embodiments, the compressor can also include any of the foregoing high temperature valve arrangements.

While advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly described or shown herein.

We claim:

1. An engine system, comprising:
   a compressor having a compressor inlet and a compressor outlet;
   a combustor having a combustor inlet coupled to the compressor outlet, the combustor further having a combustor outlet;
   a compressed air storage volume coupled between the compressor and the combustor;
   a positive displacement expander having an expander inlet coupled to the combustor outlet, the expander further having an expander outlet, and a work output device;
   a valve coupled between the combustor and the expander to regulate a flow of hot combustion products passing from the combustor to the expander; and
   an exhaust energy recovery device coupled to the expander outlet to extract energy from the combustion products exiting the expander.

2. The system of claim 1 wherein the exhaust energy recovery device includes a heat exchanger having a first flowpath and a second flowpath in thermal communication with the first flowpath, the first flowpath being coupled between the compressor and the combustor, the second flowpath being coupled to the expander outlet.

3. The system of claim 1 wherein the valve includes a rotary valve.

4. The system of claim 3 wherein the rotary valve includes:
a cylinder having a wall positioned radially outwardly around an annular passage, the cylinder being rotatable about an axis aligned generally axially with the annular passage, the wall having a port that aligns with the expander inlet when the cylinder is at a first rotational position and that does not align with the expander inlet when the cylinder is at a second rotational position different than the first.

5. The system of claim 3 wherein the valve includes an actively cooled rotary valve.

6. The system of claim 1 wherein the valve is formed from materials that are rated to withstand sustained temperatures in excess of 1400K.

7. The system of claim 1, further comprising a fuel source coupled to the combustor.

8. The system of claim 1, further comprising a valve coupled among the compressor, the storage volume and the combustor, the valve having a first position to direct air from the compressor to the storage volume, the valve having a second position to direct air from the storage volume to the combustor.

9. The system of claim 1 wherein the compressed air storage volume includes a portable storage tank.

10. The system of claim 9 wherein the storage tank, the compressor, the combustor, the expander and the exhaust energy recovery device are housed in a portable storage container.

11. The system of claim 9 wherein the storage tank, the compressor, the combustor, the expander and the exhaust energy recovery device are housed on a rail car.

12. The system of claim 1 wherein the storage volume includes a subterranean volume.

13. The system of claim 1 wherein the storage volume includes a submarine volume.

14. An engine system, comprising:
a multi-stage compressor having a compressor inlet and a compressor outlet;
an intercooler coupled in fluid communication between stages of the compressor;
a combustor having a combustor inlet coupled to the compressor outlet, the combustor further having a combustor outlet;
a positive displacement expander having an expander inlet coupled to the combustor outlet, the expander further having an expander outlet, and a work output device;
a regenerative fluid system coupled to at least one of the combustor and the expander to cool the at least one of the combustor and the expander, and further coupled to the combustor to deliver a regenerative fluid to the combustor; and
an exhaust energy recovery device coupled to the expander outlet to extract energy from combustion products exiting the expander.

15. The system of claim 14 wherein the exhaust energy recovery device includes a heat exchanger having a first flowpath and a second flowpath in thermal communication with the first flowpath, the first flowpath being coupled between the compressor and the combustor, the second flowpath being coupled to the expander outlet.

16. The system of claim 14, further comprising a valve between the combustor and the expander, the valve having an operating range of up to about 2400K.

17. The system of claim 14 wherein the expander is a rotary expander, and wherein the system includes a port and no valve coupled in fluid communication between the expander inlet and the combustor outlet.

18. The system of claim 14 wherein the expander is a reciprocating expander.

19. The system of claim 14, further comprising a controller operatively coupled to the combustor to control an intermittent combustion process at the combustor.

20. The system of claim 19 wherein the controller includes a computer readable medium programmed with instructions for controlling the intermittent combustion process at the combustor.

21. The system of claim 14 wherein the combustor has an uninterrupted inlet and is positioned to provide a continuous flow of combustion products to the expander over multiple expander cycles.

22. An engine system, comprising:
a semi-isothermal compressor having:
a compressor inlet;
a compressor outlet;
a first compressor stage having a first stage outlet;
a second compressor stage coupled to the first compressor stage and having a second stage inlet; and
an intercooler coupled in fluid communication between the first stage outlet and the second stage inlet;
a combustor having a combustor inlet coupled to the compressor outlet, the combustor further having a combustor outlet;
a reciprocating positive displacement expander having an expander inlet coupled to the combustor outlet, the expander further having an expander outlet, and a shaft output device;
a valve coupled between the combustor and the expander to regulate a flow of hot combustion products passing from the combustor to the expander, the valve including:
a valve body;
a cylinder rotatably housed in the valve body, the cylinder having a wall positioned radially outwardly from an annular passage, the cylinder being rotatable about an axis aligned generally axially with the annular passage, the wall having a port that aligns with the expander inlet when the cylinder is at a first rotational position and that does not align with the expander inlet when the cylinder is at a second rotational position different than the first, wherein the cylinder includes an axially extending first gas passage and an axially extending second gas passage positioned annularly inwardly from and coupled to the first gas passage, and wherein the first gas passage is positioned to receive a flow of cooling gas and direct the cooling gas in a first axial direction into the second gas passage, and wherein the second gas passage is positioned to receive the cooling gas from the first gas passage and direct the cooling gas in a second axial direction opposite the first axial direction and into the annular passage; and
a heat exchanger having a first flowpath and a second flowpath in thermal communication with the first flowpath, the first flowpath being coupled between a storage vessel and the combustor, the second flowpath being coupled to the expander outlet.

23. The system of claim 22, wherein the compressor is a first compressor, and wherein the system further comprises:
a fluid storage volume;
a second compressor coupled between the fluid storage volume and the first compressor, wherein the second compressor is dynamically reversible to operate alternately as a compressor and an expander.

24. An engine system, comprising:
a compressor having a compressor inlet and a compressor outlet;
a combustor having a combustor inlet coupled to the compressor outlet, the combustor further having a combustor outlet;
a positive displacement expander having an expander inlet coupled to the combustor outlet, the expander further having an expander outlet, and a work output device;
a rotary valve coupled between the combustor and the expander to regulate a flow of hot combustion products passing from the combustor to the expander, wherein the rotary valve includes:
 a cylinder having a wall positioned radially outwardly around an annular passage, the cylinder being rotatable about an axis aligned generally axially with the annular passage, the wall having a port that aligns with the expander inlet when the cylinder is at a first rotational position and that does not align with the expander inlet when the cylinder is at a second rotational position different than the first; and
an exhaust energy recovery device coupled to the expander outlet to extract energy from the combustion products exiting the expander.

25. The system of claim 24 wherein the valve includes at least one axially extending first gas passage and at least one axially extending second gas passage positioned annularly inwardly from and coupled to the at least one first gas passage, and wherein the first gas passage is positioned to receive a flow of cooling gas and direct the cooling gas in a first axial direction into the second gas passage, and wherein the second gas passage is positioned to receive the cooling gas from the first gas passage and direct the cooling gas in a second axial direction opposite the first axial direction.

26. The system of claim 25 wherein the second gas passage is further positioned to direct the cooling flow into the annular passage.

27. An engine system, comprising:
a compressor having a compressor inlet and a compressor outlet;
a combustor having a combustor inlet coupled to the compressor outlet, the combustor further having a combustor outlet;
a positive displacement expander having an expander inlet coupled to the combustor outlet, the expander further having an expander outlet, and a work output device;
an actively cooled rotary valve coupled between the combustor and the expander to regulate a flow of hot combustion products passing from the combustor to the expander; and
an exhaust energy recovery device coupled to the expander outlet to extract energy from the combustion products exiting the expander.

28. The system of claim 27 wherein the valve includes at least one cooling gas passage.

* * * * *